US010148925B2

(12) United States Patent
Nakashin

(10) Patent No.: US 10,148,925 B2
(45) Date of Patent: Dec. 4, 2018

(54) PROJECTOR AND METHOD OF CONTROLLING PROJECTOR TO DISPLAY AN IMAGE BASED ON EVALUATION VALUE AFTER FOCUS ADJUSTMENT

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 14/622,751

(22) Filed: Feb. 13, 2015

(65) Prior Publication Data

US 2015/0237318 A1  Aug. 20, 2015

(30) Foreign Application Priority Data

Feb. 14, 2014  (JP) ................................. 2014-026311
Jan. 22, 2015  (JP) ................................. 2015-010190

(51) Int. Cl.
| H04N 3/22 | (2006.01) |
| H04N 9/31 | (2006.01) |
| H04N 5/232 | (2006.01) |
| G03B 21/53 | (2006.01) |

(52) U.S. Cl.
CPC .......... H04N 9/3188 (2013.01); G03B 21/53 (2013.01); H04N 5/23212 (2013.01); H04N 9/317 (2013.01); H04N 9/3194 (2013.01)

(58) Field of Classification Search
CPC .... H04N 9/3188; H04N 9/317; H04N 9/3194; H04N 5/23212; G03B 21/53
See application file for complete search history.

(56) References Cited

U.S. PATENT DOCUMENTS

| 6,332,061 B1 * | 12/2001 | Arita .................... G03B 13/36 396/104 |
| 6,636,298 B1 * | 10/2003 | Bachelder .......... G01N 21/8806 356/73.1 |
| 8,714,754 B2 | 5/2014 | Kaneko |

(Continued)

FOREIGN PATENT DOCUMENTS

| JP | 2007-248616 A | 9/2007 |
| JP | 2007-279677 A | 10/2007 |

(Continued)

*Primary Examiner* — Jeffrey F Harold
*Assistant Examiner* — Humam M Satti
(74) *Attorney, Agent, or Firm* — Maschoff Brennan

(57) ABSTRACT

A projector includes a projection optical system adapted to project an image on a screen, a lens drive section adapted to perform a focus adjustment in accordance with an operation, a shooting section adapted to shoot the screen, an evaluation value calculation section adapted to calculate an evaluation value used to evaluate contrast of a shot image of the shooting section, and a display control section adapted to make the projection lens project an image, which corresponds to a difference between the evaluation value calculated by the evaluation value calculation section after the focus adjustment and a maximum value of the evaluation values having been calculated by the evaluation value calculation section before the focus adjustment, on the screen in a case in which the lens drive section has performed the focus adjustment in accordance with the operation.

10 Claims, 18 Drawing Sheets

(56) References Cited

U.S. PATENT DOCUMENTS

| | | | |
|---|---|---|---|
| 8,804,054 B2 | 8/2014 | Nakashin et al. | |
| 2003/0201393 A1* | 10/2003 | Tsuneta | H01J 37/26 250/311 |
| 2010/0214540 A1* | 8/2010 | Sajadi | G03B 3/00 353/101 |
| 2011/0249150 A1* | 10/2011 | Shintani | H04N 5/23212 348/240.3 |
| 2011/0292303 A1* | 12/2011 | Nimura | H04N 9/3194 348/745 |
| 2013/0141593 A1* | 6/2013 | Bassi | H04N 9/3147 348/188 |
| 2013/0322753 A1* | 12/2013 | Lim | G06T 5/001 382/167 |

FOREIGN PATENT DOCUMENTS

| | | |
|---|---|---|
| JP | 2008-033130 A | 2/2008 |
| JP | 2012-008522 A | 1/2012 |
| JP | 2012-256079 A | 12/2012 |
| JP | 2013-186331 A | 9/2013 |
| JP | 2013-257585 A | 12/2013 |

\* cited by examiner

FIG. 3B  FOCUSED STATE

HIGH-FREQUENCY INTENSITY: HIGH
CONTRAST: HIGH
⇩
EVALUATION VALUE: HIGH

FIG. 3C  DEFOCUSED STATE

HIGH-FREQUENCY INTENSITY: LOW
CONTRAST: LOW
⇩
EVALUATION VALUE: LOW

| IMAGE NUMBER | UI IMAGE |
|---|---|
| 1 | |
| 2 | |
| 3 | |
| 4 | |
| 5 | |
| 6 | |
| 7 | |
| 8 | |
| 9 | |
| 10 | |

FIG. 5

BEFORE MAXIMUM VALUE IS OBTAINED

AFTER MAXIMUM VALUE IS OBTAINED

PROJECTOR AND METHOD OF CONTROLLING PROJECTOR TO DISPLAY AN IMAGE BASED ON EVALUATION VALUE AFTER FOCUS ADJUSTMENT

The entire disclosure of Japanese Patent Application Nos. 2014-026311, filed Feb. 14, 2014 and 2015-010190, filed Jan. 22, 2015 are expressly incorporated by reference herein.

BACKGROUND

1. Technical Field

The present invention relates to a projector, and a method of controlling a projector.

2. Related Art

There has been known a technology of calculating a focus evaluation value representing sharpness of focus in the case of manually performing focus adjustment of a lens, and display the focus evaluation value to provide the user with the focus evaluation value (see, e.g., JP-A-2007-279677 (Document 1) and JP-A-2007-248616 (Document 2)). Documents 1 and 2 disclose a technology of displaying the focus evaluation value in a finder with a bar in a camera capable of manual focus adjustment. In the example of Documents 1 and 2, the bar displayed in the finder represents the fact that the longer the bar is, the higher the evaluation value is, and the shorter the bar is, the lower the evaluation value is, and the best focused state is achieved when the length of the bar becomes the longest. The user determines the focusing state with reference to the length of the bar, and then performs an operation of the focus adjustment.

In the example of Documents 1 and 2, the bar representing the focus evaluation value is displayed in the finder of the camera, and is therefore clearly displayed irrespective of the focusing state. Therefore, even if the focus for shooting is not achieved, the focusing state can be determined based on the length of the bar.

Incidentally, in the projector for projecting an image on a projection surface, when considering the case of performing the focus adjustment showing the sharpness of the focus using the image, if the sharpness of the focus is not sufficient, the visibility of the image itself representing the sharpness of the focus is also not sufficient. Therefore, there is a problem that it is difficult for the user to know the sharpness of the focus. Therefore, it has been difficult to apply the related art described in Documents 1 and 2 to the projector.

SUMMARY

An advantage of some aspects of the invention is to provide a projector and a method of controlling a projector each capable of showing the sharpness of the focus in an easy-to-understand manner in the case of performing the focus adjustment of the projector.

An aspect of the invention is directed to a projector including a projection section adapted to project an image on a projection surface, a focus adjustment section adapted to perform a focus adjustment of the projection section in accordance with an operation, a shooting section adapted to shoot the projection surface, an evaluation value calculation section adapted to calculate an evaluation value used to evaluate contrast of a shot image of the shooting section, and a control section adapted to make the projection section project an image, which corresponds to a difference between the evaluation value calculated by the evaluation value calculation section after the focus adjustment and a maximum value of the evaluation values having been calculated by the evaluation value calculation section before the focus adjustment, on the projection surface in a case in which the focus adjustment section has performed the focus adjustment in accordance with the operation.

According to this aspect of the invention, by projecting the image representing the sharpness of the focus on the projection surface in the case of performing the focus adjustment of the projector, the sharpness of the focus can be shown to the user in an easy-to-understand manner.

Another aspect of the invention is directed to the projector according to the aspect of the invention described above, wherein the projector further includes a storage section, the control section stores the evaluation value, which has been calculated by the evaluation value calculation section with respect to the shot image shot by the shooting section after the focus adjustment, in the storage section in the case in which the focus adjustment section has performed the focus adjustment in accordance with the operation, and then the control section obtains the maximum value of the evaluation value based on the evaluation values stored in the storage section.

According to this aspect of the invention, in the case in which the focus adjustment has been performed a plurality of times, the maximum value can promptly be obtained.

Still another aspect of the invention is directed to the projector according to the aspect of the invention described above, wherein the control section makes the image, which corresponds to a difference between an initial value of the evaluation value and the evaluation value calculated by the evaluation value calculation section after the focus adjustment, be projected until the maximum value of the evaluation value is obtained, and the control section makes the image, which corresponds to a difference between the maximum value of the evaluation value and the evaluation value calculated by the evaluation value calculation section after the focus adjustment, be projected after the maximum value of the evaluation value is obtained.

According to this aspect of the invention, it is possible to make the user recognize the difference between the initial value of the evaluation value and the evaluation value obtained after the focus adjustment until the maximum value of the evaluation value is obtained. Further, it is possible to make the user recognize the difference between the maximum value of the evaluation value and the evaluation value obtained after the focus adjustment after the maximum value of the evaluation value is obtained.

Yet another aspect of the invention is directed to the projector according to the aspect of the invention described above, wherein the image includes a plurality of figures, and the control section makes the image, which has a distance between the figures correspond to the difference, be projected on the projection surface.

According to this aspect of the invention, it is possible to display the image representing the difference between the evaluation value obtained after the focus adjustment and the initial value or the maximum value of the evaluation value with the distance between the figures. Therefore, it is possible to display the image easy for the user to recognize the difference.

Still yet another aspect of the invention is directed to the projector according to the aspect of the invention described above, wherein the control section selects the distance between the figures in the image from a plurality of levels of distance set in advance, and then makes the image be projected, and the control section has hysteresis characteristics with respect to a variation in the difference of the evaluation value in a case of changing the distance between the figures in the image in accordance with the difference of the evaluation value after the focus adjustment by the focus adjustment section.

According to this aspect of the invention, the fluctuation of the image due to the jitter or the like can be inhibited.

Further another aspect of the invention is directed to the projector according to the aspect of the invention described above, wherein the control section makes the image having the figure shaped differently be projected in a case in which it is determined that the focus has been achieved based on the evaluation value obtained after the focus adjustment by the focus adjustment section.

According to this aspect of the invention, it is possible to easily make the user recognize the case in which it is determined that the focus has been achieved.

Still further another aspect of the invention is directed to the projector according to the aspect of the invention described above, wherein the project further includes a sound output section adapted to output a sound, and the control section makes the sound output section output the sound based on the evaluation value obtained after the focus adjustment by the focus adjustment section.

According to this aspect of the invention, it is possible to make the user recognize the sharpness of the focus using a sound.

Yet further another aspect of the invention is directed to a method of controlling a projector including performing a focus adjustment of a projection section adapted to project an image on a projection surface in accordance with an operation, shooting the projection surface by a shooting section, calculating an evaluation value used to evaluate contrast of a shot image of the shooting section, and making the projection section project an image, which corresponds to a difference between the evaluation value calculated in the calculating of an evaluation value after the focus adjustment and a maximum value of the evaluation values having been calculated in the calculating of an evaluation value before the focus adjustment, on the projection surface in a case in which the focus adjustment has been performed in the performing of a focus adjustment.

According to this aspect of the invention, in the case of performing the focus adjustment of the projector, it is possible to project the image representing the sharpness of the focus on the projection surface. Therefore, it is possible to show the sharpness of the focus to the user in an easy-to-understand manner.

According to the aspects of the invention, in the case of performing the focus adjustment of the projector, it is possible to show the sharpness of the focus to the user in an easy-to-understand manner.

BRIEF DESCRIPTION OF THE DRAWINGS

The invention will be described with reference to the accompanying drawings, wherein like numbers reference like elements.

FIGS. 3B and 3C are diagrams each showing a curve representing a variation in luminance Y along a lateral direction H of the pattern image.

FIG. 5 is a diagram showing examples of a UI image of the embodiment of the invention.

DESCRIPTION OF AN EXEMPLARY EMBODIMENT

Hereinafter, an embodiment of the invention will be explained with reference to the accompanying drawings.

Figure 1:
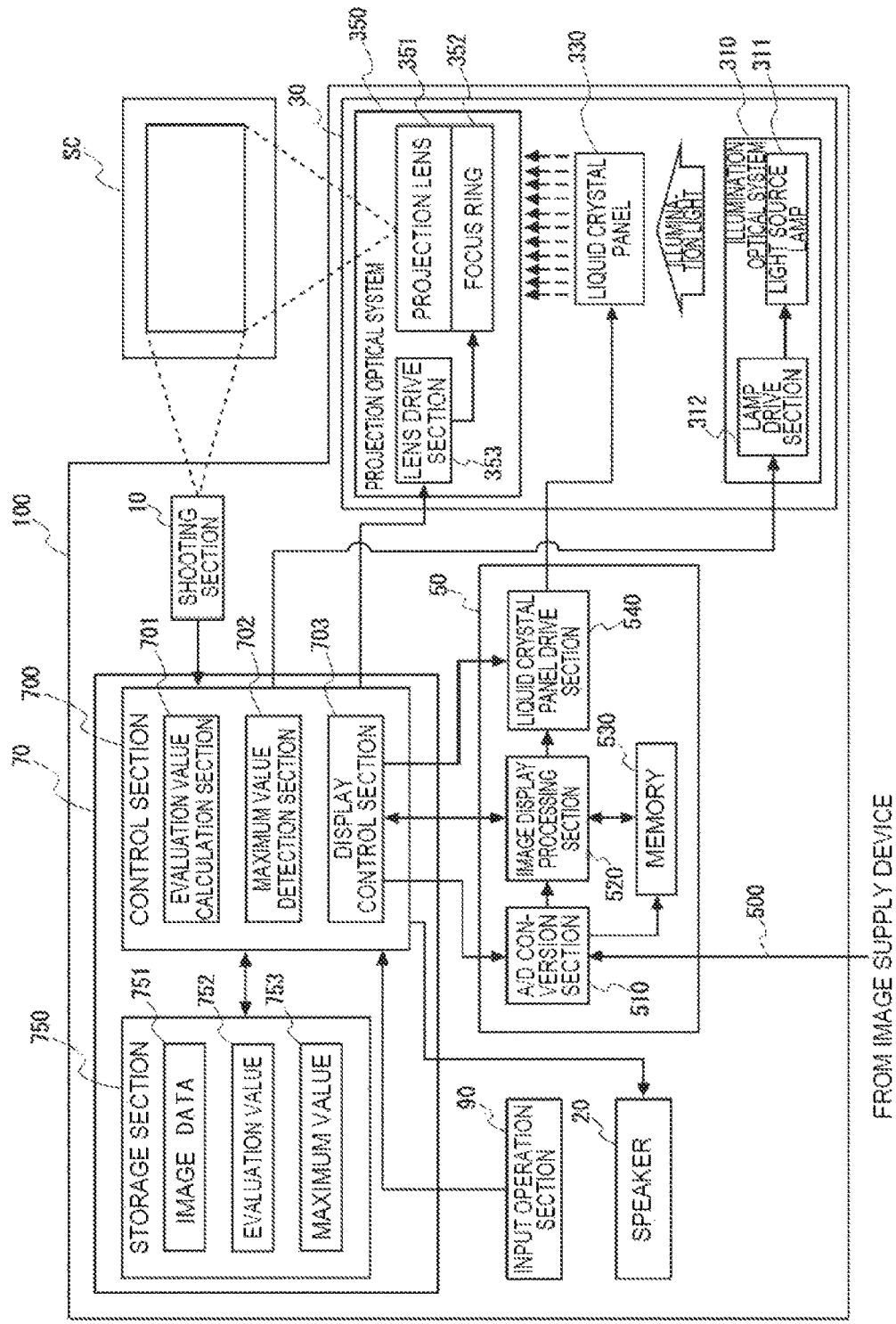
FIG. 1 is a diagram showing a configuration of a projector of an embodiment of the invention.

Firstly, rough outline of a hardware configuration of a projector 100 will be explained with reference to FIG. 1. The projector 100 projects image light representing an image on a projection surface such as a screen SC to thereby display the image on the projection surface.

The projector 100 is provided with a shooting section 10, a speaker 20, an image projection optical system 30, an image processing operation circuit 50, a control device 70, and an input operation section 90.

The shooting section 10 is provided with a charge coupled device (CCD) camera, and shoots a variety of images. Image data shot by the shooting section 10 is hereinafter referred to as shot image data. The shot image data obtained by the shooting section 10 is stored in a storage section 750 described later. It should be noted that the shooting section 10 can also be provided with other devices capable of shooting such as a CMOS camera instead of the CCD camera.

The speaker 20 outputs a sound signal output from the control device 70. For example, the control device 70 outputs a sound signal, which represents the sharpness of the focus of the image light to be projected on the screen SC by a projection optical system 350 described later, from the speaker 20.

The image projection optical system 30 generates the image light representing the image, and then projects the image light on the screen SC in an enlarged manner. The image projection optical system 30 is further provided with an illumination optical system 310, a liquid crystal panel 330, and the projection optical system 350.

The illumination optical system 310 is provided with a light source lamp 311 and a lamp drive section 312. As the light source lamp 311, a variety of types of self-luminescent elements such as a discharge emission light source lamp including a super-high pressure mercury lamp, a metal halide lamp, and so on, a light emitting diode, a laser source, or an organic electro luminescence (EL) element can be used. The lamp drive section 312 drives the light source lamp 311 based on the control by the control device 70.

The liquid crystal panel 330 is a light modulation device for modulating the light emitted from the illumination optical system 310 based on the image data. The liquid crystal panel 330 is provided with a transmissive panel having a plurality of pixels arranged in a matrix.

The liquid crystal panel 330 modulates the illumination light emitted from the illumination optical system 310 into the image light representing the image based on the drive signal output from the liquid crystal panel drive section 540 of the image processing operation circuit 50 described later.

The projection optical system 350 images the image light having been emitted from the liquid crystal panel 330 on the screen SC to thereby project the image light on the screen SC in an enlarged manner. The projection optical system 350 is provided with a projection lens 351 and a lens drive section 353. The projection lens 351 includes a plurality of lenses (not shown), and a focus ring 352 for moving the focus of the image light to be projected on the screen SC by the projection lens 351 (hereinafter simply referred to as focus). The lens drive section 353 rotationally drives the focus ring 352 due to the control by the control device 70. The control section 700 drives the lens drive section 353 in accordance with the operation information input from the input operation section 90 to rotate the focus ring 352. By rotating the focus ring 352, the arrangement of the lens inside the projection lens 351 mechanically connected to the focus ring 352 is varied, and thus, the focus position is moved. Thus, the focus of the image light can be adjusted.

The image processing operation circuit 50 is provided with an analog/digital (hereinafter abbreviated as A/D) conversion section 510, an image display processing section 520, a memory 530, and a liquid crystal panel drive section 540.

The A/D conversion section 510 performs A/D conversion on in input image signal input via a cable 500 from an image supply device such as a digital versatile disk (DVD) player or a personal computer (PC) based on the control by the control section 70. The A/D conversion section 510 writes the digital image signal obtained by the A/D conversion into the memory 530. The image display processing section 520 readout the digital image signal thus written in the memory 530, and then performs a variety of image processing such as a keystone distortion correction process, or an adjustment of the display state (e.g., luminance, contrast, synchronization, tracking, color depth, and tint) of the image. The image display processing section 520 transmits the digital image signal, on which the image processing has been performed, to the liquid crystal panel drive section 540. The liquid crystal panel drive section 540 drives the liquid crystal panel 330 with the digital image signal obtained from the image display processing section 520.

The control device 70 is provided with a control section 700 and a storage section 750. The control section 700 is a computer provided with a central processing unit (CPU), a read only memory (ROM), a random access memory (RAM), and so on. The storage section 750 stores data for a variety of control processes. For example, the storage section 750 stores image data 751, an evaluation value 752, a maximum value 753 of the evaluation value, and so on. The details thereof will be described later.

The control section 700 is provided with function blocks each realized by a cooperation between hardware such as the CPU and the RAM, and a control program recorded on the ROM. The control section 700 is provided with an evaluation value calculation section 701, a maximum value detection section 702, and a display control section 703 as the functional blocks.

Figure 2:
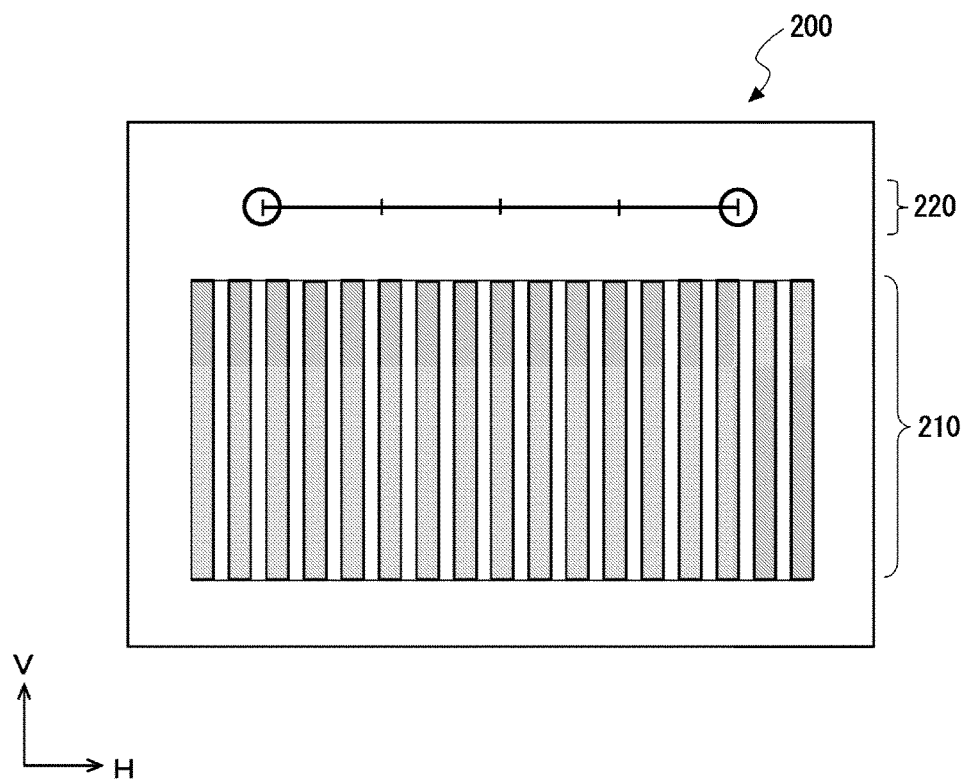
FIG. 2 is a diagram showing an example of an adjusting image of the embodiment of the invention.

The evaluation value calculation section 701 analyzes the shot image data shot by the shooting section 10 to calculate the evaluation value representing the sharpness of the focus. FIG. 2 shows an example of an adjusting image 200 to be projected on the screen SC for evaluating the sharpness of the focus. The adjusting image 200 includes a pattern image 210 and a user interface (UI) image 220. The pattern image 210 is an image to be projected on the screen SC for evaluating the sharpness of the focus. The pattern image 210 has a rectangular pattern having dark areas (the areas provided with hatching in the drawing) and bright areas (the areas not provided with hatching) arranged alternately along a horizontal direction H and each extending in a vertical direction V perpendicular to the horizontal direction H. The color of the dark areas is black, and the color of the bright areas is white. The UI image 220 is an image representing an evaluation result obtained by shooting the pattern image 210 projected on the screen SC, and then evaluating the sharpness of the focus based on the pattern image 210 thus shot.

Figure 3A:
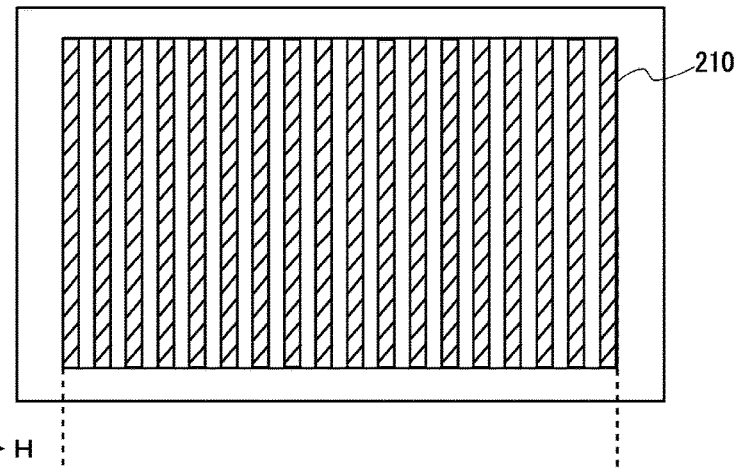
FIG. 3A is a diagram showing a part corresponding to a pattern image out of the adjusting image.
Figure 3A:
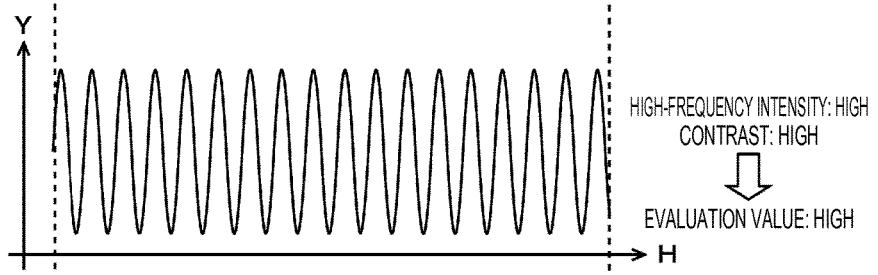
Figure 3A:
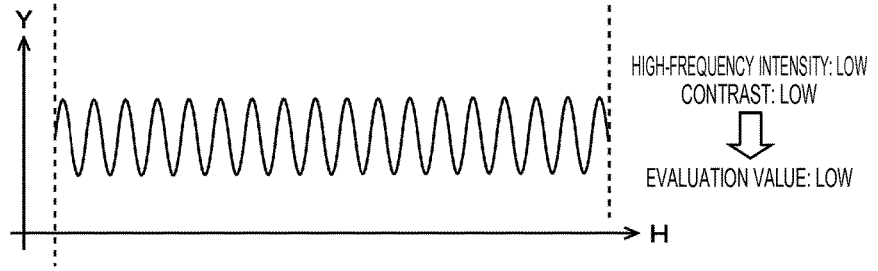

Here, an example of the calculation method of the evaluation value using the pattern image 210 will be explained with reference to FIGS. 3A through 3C. FIG. 3A shows a part corresponding to the pattern image 210 out of the adjusting image 200 shown in FIG. 2. FIGS. 3B and 3C each show a curve representing the variation in the luminance Y along the horizontal direction H of the pattern image 210 obtained by analyzing the shot image data obtained by shooting the pattern image 210 shown in FIG. 3A.

The evaluation value calculation section 701 obtains the curve of the luminance Y by analyzing the image data of the part corresponding to the pattern image 210 out of the shot image data. Then, the evaluation value calculation section 701 resolves the curve of the luminance Y with spatial frequencies to calculate the intensity distribution, and then calculates an integration value of the intensities of the spatial frequency components higher than a predetermined threshold. Hereinafter, this integration value is referred to also as a "high-frequency intensity." The high-frequency intensity is maximized in the case in which the screen SC is focused on. The evaluation value calculation section 701 calculates the proportion of the high-frequency intensity to a reference value representing the maximum value as the evaluation value (the unit thereof is percent). Such a reference value is experimentally determined in advance. Further, it is also possible to use the high-frequency intensity obtained by analyzing the pattern image 210 in the adjusting image 200 as the reference value.

FIG. 3B shows the case in which the screen SC is focused on. In this case, in the pattern image 210 having been projected on the screen SC, the boundary between the bright area and the dark area is clearly expressed. As a result, the luminance Y is roughly constant in each of the bright areas and the dark areas, and the luminance Y changes roughly vertically at the boundary between the bright area and the dark area. As a result, the high-frequency intensity becomes high. Further, the contrast becomes high.

FIG. 3C shows the case in which the projection image having been projected on the screen SC is defocused, namely the case in which the screen SC is not focused on. In this case, in the pattern image 210 having been projected on the screen SC, an area in the vicinity of the boundary between the bright area and the dark area is expressed as if the white color and the black color were mixed. As a result, in a part of the bright area near to the boundary, the luminance Y is lowered compared to the case in which the screen SC is focused on. Further, in a part of the dark area near to the boundary, the luminance Y is raised compared to the case in which the screen SC is focused on. Further, in the case in which the screen SC is not focused on, even in the area far from the boundary, the mixture between the white color and the black color occurs. Therefore, the more significant the defocus is, the smaller the variation in luminance Y becomes, and the gentler the curve of the luminance Y becomes. As a result, the high-frequency intensity becomes low. Further, the contrast becomes low.

Then, the maximum value detection section 702 will be explained. The maximum value detection section 702 detects the maximum value of the evaluation value stored in the storage section 750.

After the input operation section 90 is operated by the user, the control device 70 controls the lens drive section 353 to rotationally drive the focus ring 352. In the case in which the focus ring 352 is rotationally driven by the lens drive section 353, and thus, the focus position is changed, the shooting section 10 shoots the screen SC under the control by the control section 700. The evaluation value calculation section 701 calculates the evaluation value, which corresponds to the focus position having been changed, from the shot image data. The evaluation value calculation section 701 continues to store the evaluation value thus calculated in the storage section 750. The maximum value detection section 702 obtains the maximum value (a value corresponding to a peak) of the plurality of evaluation values stored in the storage section 750.

Figure 4:
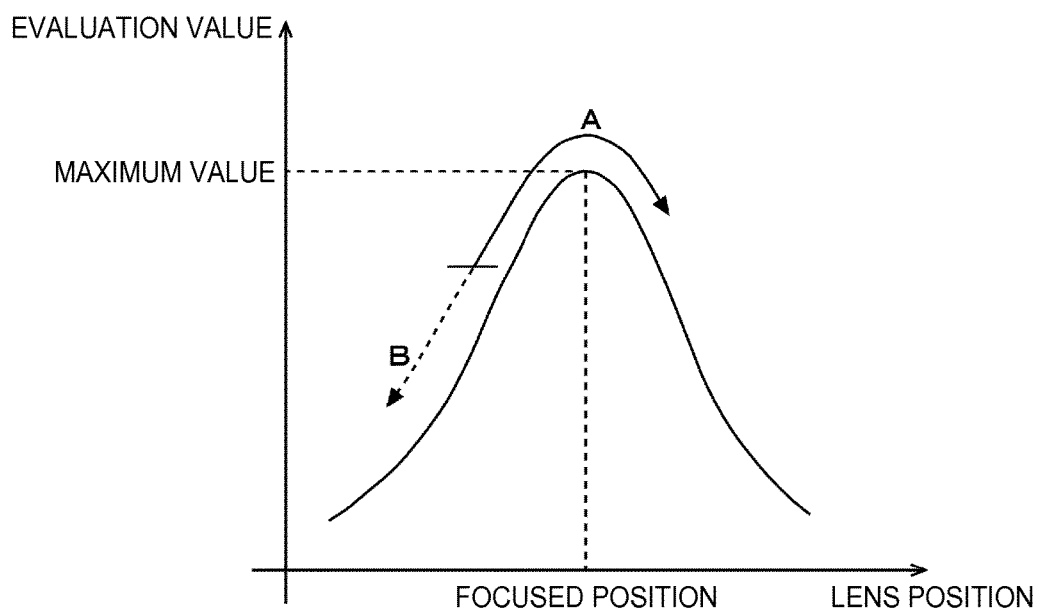
FIG. 4 is a diagram showing a relationship between a lens position of a projection lens and an evaluation value in the embodiment of the invention.

The processing operation of the maximum value detection section 702 will specifically be explained with reference to FIG. 4. FIG. 4 is a diagram showing an example of a relationship between the lens positions of the projection lens 351 and the evaluation values calculated at the respective lens positions.

As shown in FIG. 4, the evaluation value takes the maximum value at the focused position where the screen SC is focused on, and decreases as the defocus develops. The user operates the input operation section 90 to thereby change the focus position, and detects the position where the evaluation value takes the maximum value. For example, in the motion A of the projection lens 351 indicated by the solid line in FIG. 4, the evaluation value monotonically increases to reach a peak, and then takes a downward turn. In the case in which the evaluation value varies in such a manner, the maximum value detection section 702 can confirm the presence of the maximum value. In the case in which the evaluation value, which has been increasing, reaches a peak and then decreases, and then a predetermined number of evaluation values successively calculated by the evaluation value calculation section 701 are descending values, the maximum value detection section 702 determines the value of the peak as the maximum value of the evaluation value. After the maximum value detection section 702 detects the maximum value of the evaluation value, the maximum value detection section 702 notifies the display control section 703 of the fact that the maximum value has been detected, and the maximum value thus detected.

Further, in the motion B of the projection lens 351 indicated by the dotted line in FIG. 4, no peak exists, and the evaluation value decreases monotonically. In this case, the maximum value detection section 702 cannot detect the maximum value of the evaluation value.

The display control section 703 obtains the evaluation value from the evaluation value calculation section 701. Further, in the case in which the maximum value detection section 702 has detected the maximum value of the evaluation value, the display control section 703 obtains the notification that the maximum value has been detected, and the maximum value of the evaluation value thus detected from the maximum value detection section 702. In the case in which the focus adjustment has been performed, the display control section 703 generates an image representing the sharpness of the focus based on the evaluation values output from the evaluation value calculation section 701.

Firstly, the display control section 703 calculates a difference between the evaluation value obtained from the evaluation value calculation section 701 after the focus adjustment and an initial value of the evaluation value. The initial value of the evaluation value is the evaluation value first calculated by the evaluation value calculation section 701 after the focus adjustment is started. Further, in the case in which the display control section 703 receives the notification that the maximum value of the evaluation value has been obtained from the maximum value detection section 702, the display control section 703 calculates a difference between the maximum value of the evaluation value obtained from the maximum value detection section 702 and the evaluation value obtained from the evaluation value calculation section 701 after the focus adjustment.

Figure 5:
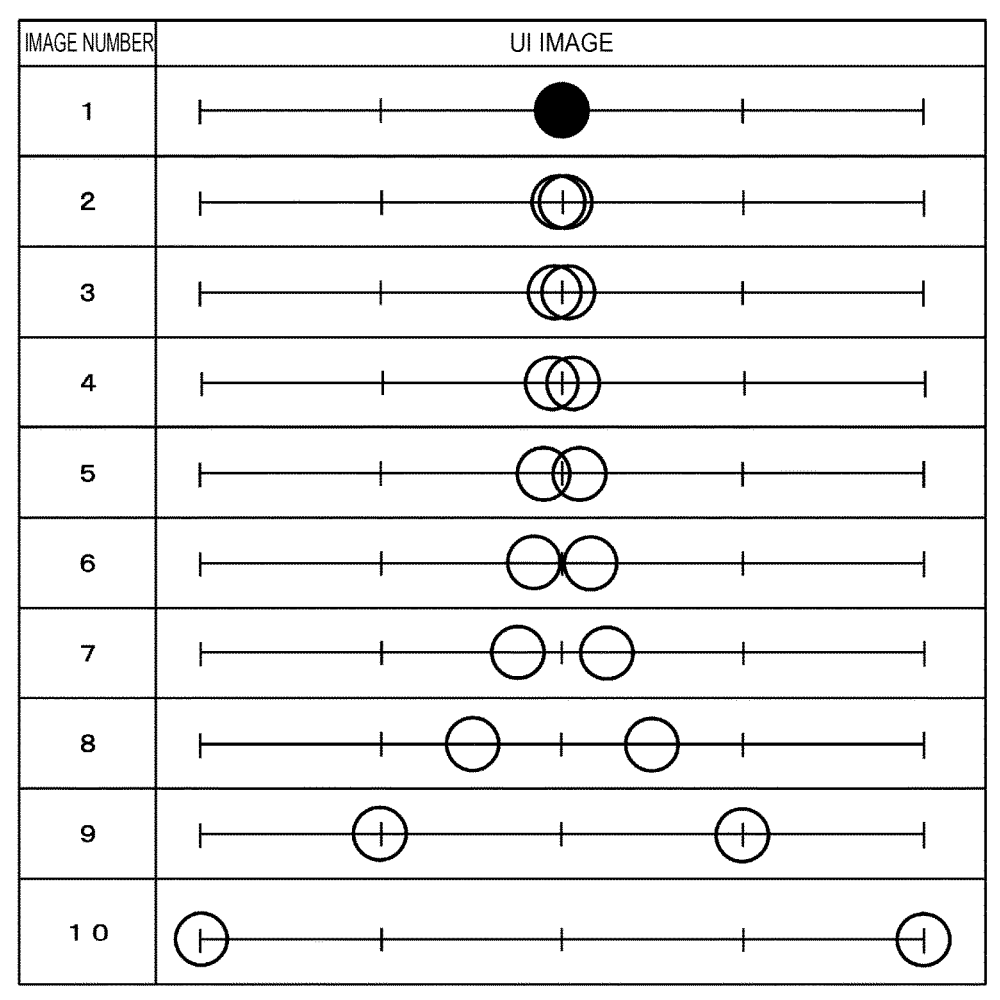

Then, the display control section 703 generates the UI image 220 representing the sharpness of the focus based on the difference thus calculated. Examples of the UI image 220 generated by the display control section 703 are shown in FIG. 5. As shown in FIG. 5, as the UI image 220, there are set 10 stages of images respectively denoted by image numbers "1" through "10" in accordance with the sharpness of the focus. The UI image 220 denoted by the image number "1" is an image displayed in the case in which the screen SC is focused on, namely the case of the focused state. In the UI image 220, there are displayed two circles, and the distance between these two circles represents the sharpness of the focus. Since the UI image 220 denoted by the image number "1" represents the focused state, the two circles are displayed so as to overlap each other.

Further, the UI images 220 denoted by the image numbers "2" through "10" are images displayed in the case in which the screen SC is not focused on, namely the case of the defocused state. The UI images 220 shown in FIG. 5 show the fact that the larger the image number becomes, the more significant the defocus on the screen SC becomes. Therefore, the larger the image number becomes, the longer the distance between the two circles displayed in the UI image 220 becomes.

Figure 6:
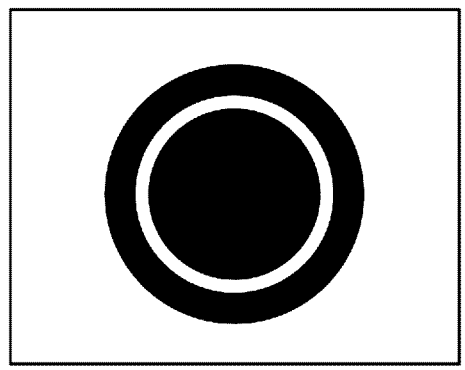
FIG. 6 is a diagram showing an example of the UI image representing the focused state.

It should be noted that although in the present embodiment, the UI images 220 each having the two circles are described, the symbol displayed in the UI image 220 is not limited to a circle. It is also possible to adopt a figure such as a triangle or a quadrangle, or a character such as an alphabet. Further, it is also possible to change the symbol to be displayed as the UI image 220 between the focused state and the defocused state other than the focused state. For example, it is also possible to display the UI images 220 denoted by the image numbers "2" through "10" shown in FIG. 5 in the defocused state, and to display a symbol formed of two circles different in size and overlapped each other as shown in FIG. 6 in the focused state. Further, it is also possible to make the color of the symbol representing the focused state different from the color of the symbols displayed in the defocused state.

Figure 7A:
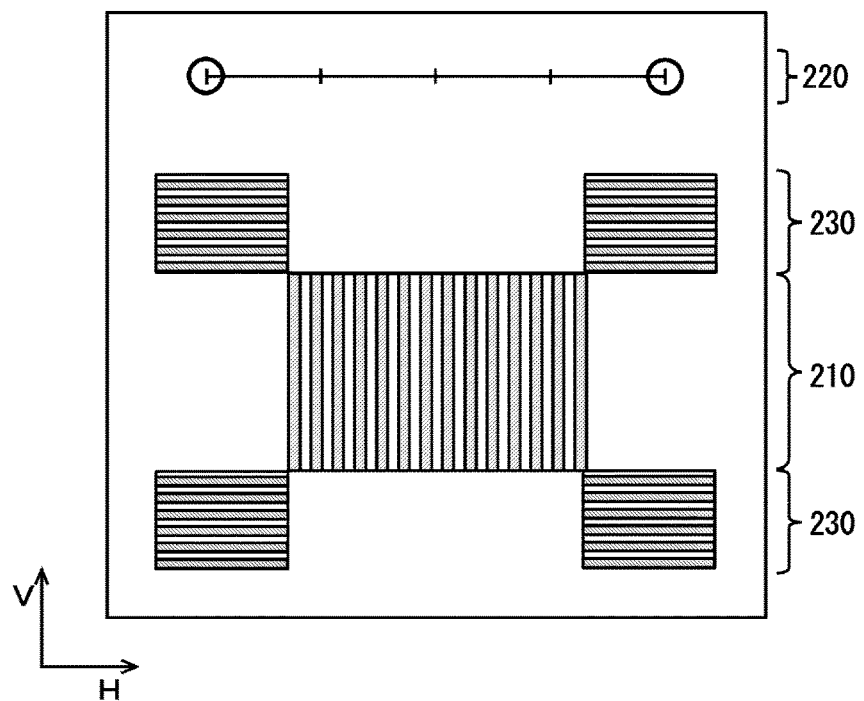
FIGS. 7A and 7B are diagrams each showing another example of the pattern image.
Figure 7B:
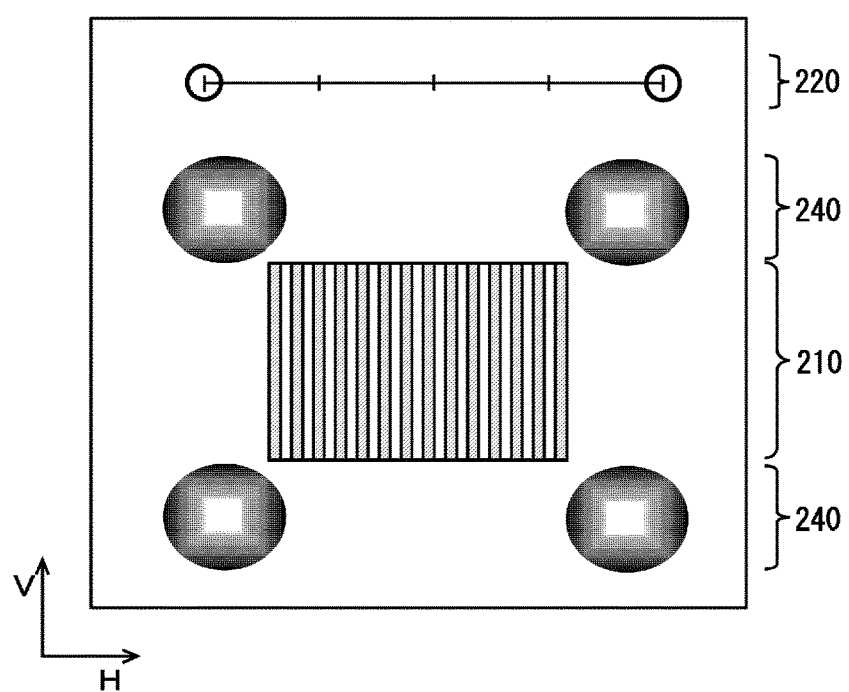

Further, it is also possible to display a plurality of pattern images different from each other in a single screen as the pattern image 210 as shown in FIGS. 7A and 7B. The pattern image shown in FIG. 7A has rectangular pattern images 230 extending in the horizontal direction H on the four corners of the pattern image 210 in addition to the pattern image 210. Since the patterns 210, 230 different from each other are provided, the accuracy of the focus adjustment can be improved. In particular, by disposing the pattern images 230 on the four corners of the pattern image 210 as shown in FIG. 7A, the accuracy of the focus adjustment in the four corners of the pattern image 210 can be improved. Further, FIG. 7B shows the case in which pattern images 240 for correcting only the keystone distortion are disposed in addition to the pattern image 210 as the pattern image. By using the pattern image shown in FIG. 7B, the focus adjustment and the correction of the keystone distortion can be achieved with a single pattern image.

The display control section 703 compares the difference thus calculated and threshold values with each other to thereby determine the sharpness of the focus. The threshold values used by the display control section 703 include focusing-direction threshold values used in the case of a direction in which the focus is achieved, and defocusing-direction threshold values using in the case of a direction in which the focus is not achieved.

For example, after the maximum value detection section 702 obtains the maximum value of the evaluation value, the display control section 703 compares the difference calculated at the previous time and the difference calculated this time with each other to thereby determine whether the difference has decreased or increased. In the case in which the display control section 703 determines that the difference has decreased as a result of the comparison, the display control section 703 determines the sharpness of the focus using the focusing-direction threshold values to generate the UI image 220 representing the sharpness of the focus thus determined. Further, in the case in which the display control section 703 determines that the difference has increased as a result of the comparison, the display control section 703 determines the sharpness of the focus using the defocusing-direction threshold values to generate the UI image 220 representing the sharpness of the focus thus determined.

Figure 8:
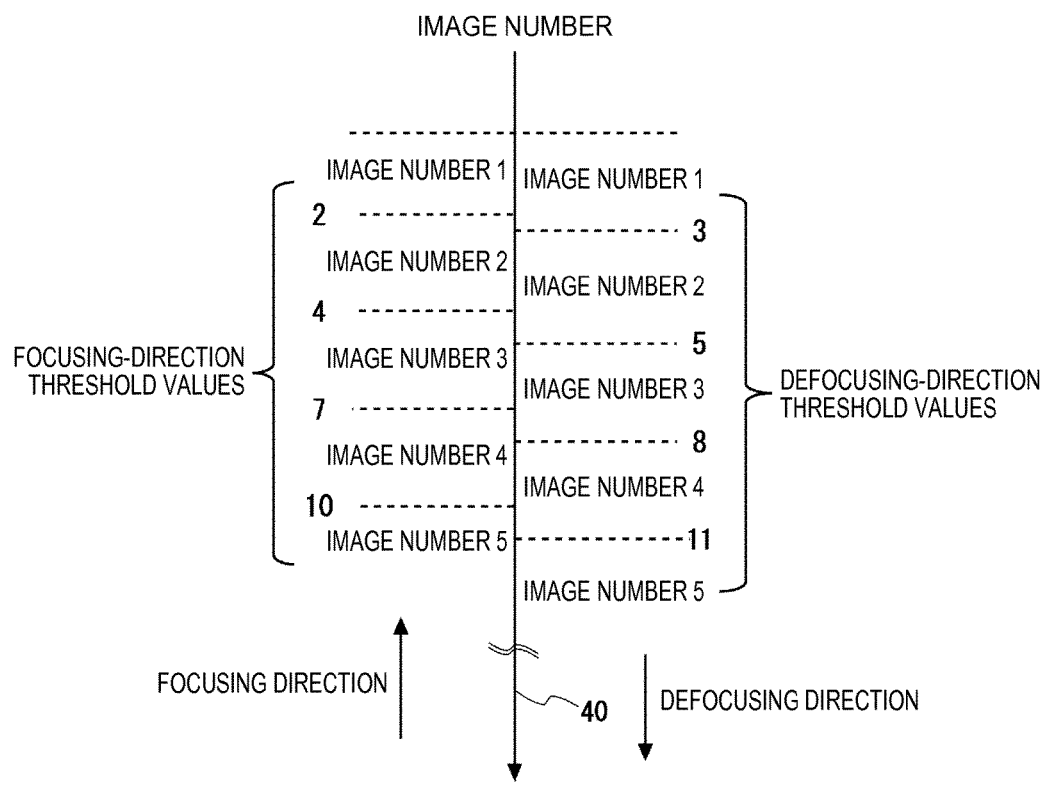
FIG. 8 is a diagram showing a relationship between the UI images, and focusing-direction threshold values and defocusing-direction threshold values in the embodiment of the invention.

FIG. 8 shows an example of a relationship between the UI images 220, and the focusing-direction threshold values and the defocusing-direction threshold values. The correspondence relationship between the focusing-direction threshold values and the image numbers is shown on the left side of the arrow line 40 shown in FIG. 8, and the correspondence relationship between the defocusing-direction threshold values and the image numbers is shown on the right side of the arrow line 40. The threshold values each representing a separation between the UI images 220 are different between the focusing-direction and the defocusing direction. For example, the threshold value for separating the UI image 220 denoted by the image number "1" and the UI image 220 denoted by the image number from each other is as the focusing-direction threshold value, but is "3" as the defocusing-direction threshold value. Similarly, the threshold value for separating the UI image 220 denoted by the image number "2" and the UI image 220 denoted by the image number "3" from each other is "4" as the focusing-direction threshold value, but is "5" as the defocusing-direction threshold value.

For example, in the case of using the focusing-direction threshold values, the display control section 703 generates the UI image 220 denoted by the image number 1 in the case in which the difference is no smaller than "0" and no larger than "2". Similarly, the display control section 703 generates the UI image 220 denoted by the image number 2 in the case in which the difference is larger than "2" and no larger than "4". Further, in the case of using the defocusing-direction threshold values, the display control section 703 generates the UI image 220 denoted by the image number 1 in the case in which the difference is no smaller than "0" and no larger than "3". Further, the display control section 703 generates the UI image 220 denoted by the image number 2 in the case in which the difference is larger than "3" and no larger than "5".

By providing hysteresis widths between the focusing-direction threshold values and the defocusing-direction threshold values, respectively, in such a manner as described above, the fluctuation of the UI image 220 in the vicinity of the threshold values due to a jitter or the like can be inhibited.

The display control section 703 outputs the UI image 220 thus generated to the image display processing section 520. The UI image 220 is displayed on the screen SC using the image projection optical system (the projection section) 30 and the image processing operation circuit 50.

The input operation section 90 is constituted by, for example, a remote controller not shown, and buttons and keys provided to the projector 100, and outputs operation information corresponding to the operation by the user to the control device 70. For example, the control device 70 inputs the operation information for rotating the focus ring 352 from the input operation section 90. The control device 70 drives the lens drive section 353 based on the operation information thus input, and then rotates the focus ring 352.

Figure 9:
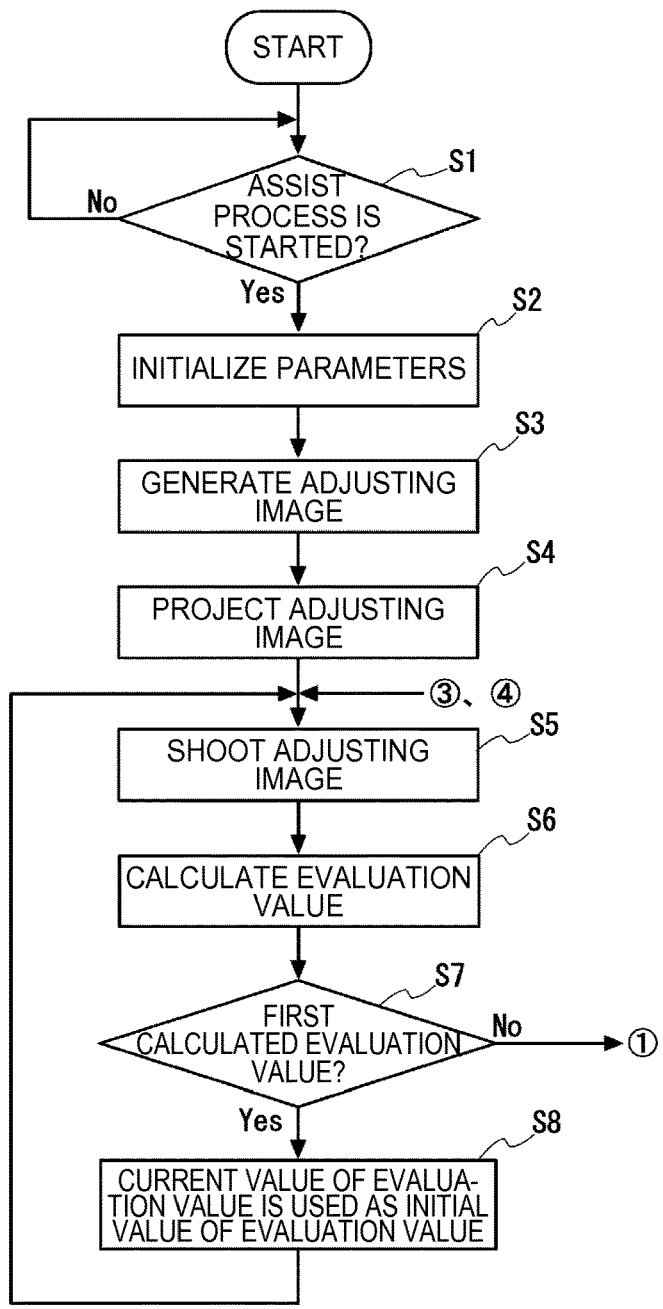
FIG. 9 is a flowchart showing a processing procedure of a focus adjustment of a control section of the embodiment of the invention.

Then, the processing procedure of a focus adjustment process will be explained with reference to a flowchart shown in FIG. 9. The focus adjustment process is started, for example, after the termination of the distortion correction process for correcting the keystone distortion of the projection image.

After the focus adjustment process is started, the control section 700 determines (step S1) whether or not start of an assist process has been selected using a predetermined menu screen or an operation button. The assist process is a process for displaying the adjusting image 200 on the screen SC in order to assist the user performing the focus adjustment process.

If it is determined that the start of the assist process has been selected (Yes in the step S1), the display control section 703 of the control section 700 performs (step S2) initialization of parameters stored in the storage section 750. The evaluation values 752, the maximum value 753 of the evaluation value stored in the storage section 750 are initialized (step S2) by the display control section 703.

Then, the display control section 703 reads out the image data 751 from the storage section 750, and then generates (step S3) the adjusting image 200 shown in FIG. 2. The display control section 703 outputs the adjusting image 200 thus generated to the image display processing section 520 of the image processing operation circuit 50. The adjusting image 200 is projected (step S4) on the screen SC using the image processing operation circuit 50 and the image projection optical system 30. It should be noted that it is also possible to arrange that the UI image 220 is not displayed on the screen SC until the adjusting image 200 is projected on the screen SC and the evaluation value representing the sharpness of the focus is calculated, or it is also possible to arrange that the UI image 220 denoted by the image number 10 is displayed as the initial image. After the adjusting image 200 is projected on the screen SC, the shooting section 10 shoots (step S5) the adjusting image 200 projected on the screen SC. The shot image data of the shooting section 10 is stored in the storage section 750, and at the same time, transmitted to the evaluation value calculation section 701 of the control section 700.

The evaluation value calculation section 701 of the control section 700 extracts a part corresponding to the pattern image from the shot image data, and then analyzes the shot image data corresponding to the pattern image part thus extracted to calculate (step S6) the evaluation value. The evaluation value calculation section 701 transmits the evaluation value thus calculated to the display control section 703 as the current value of the evaluation value, and at the same time, stores the evaluation value thus calculated in the storage section 750.

After the display control section 703 obtains the current value of the evaluation value from the evaluation value calculation section 701, the display control section 703 determines (step S7) whether or not the evaluation value is first obtained this time. In other words, the display control section 703 determines (step S7) whether or not the evaluation value is one first calculated by the evaluation value calculation section 701 after starting the focus adjustment process. In the case of the affirmative determination (Yes in the step S7), the display control section 703 set (step S8) the current value of the evaluation value having been obtained from the evaluation value calculation section 701 to the initial value of the evaluation value. Subsequently, the display control section 703 determines whether or not the input operation section 90 has been operated, and the focus ring 352 has rotated to change the focus position. If it is determined that the focus position has been changed, the display control section 703 makes the shooting section 10 shoot (step S5) the screen SC once again. Further, in the case of the negative determination (No in the step S7), the display control section 703 makes a transition to the process of the step S9.

Figure 10:
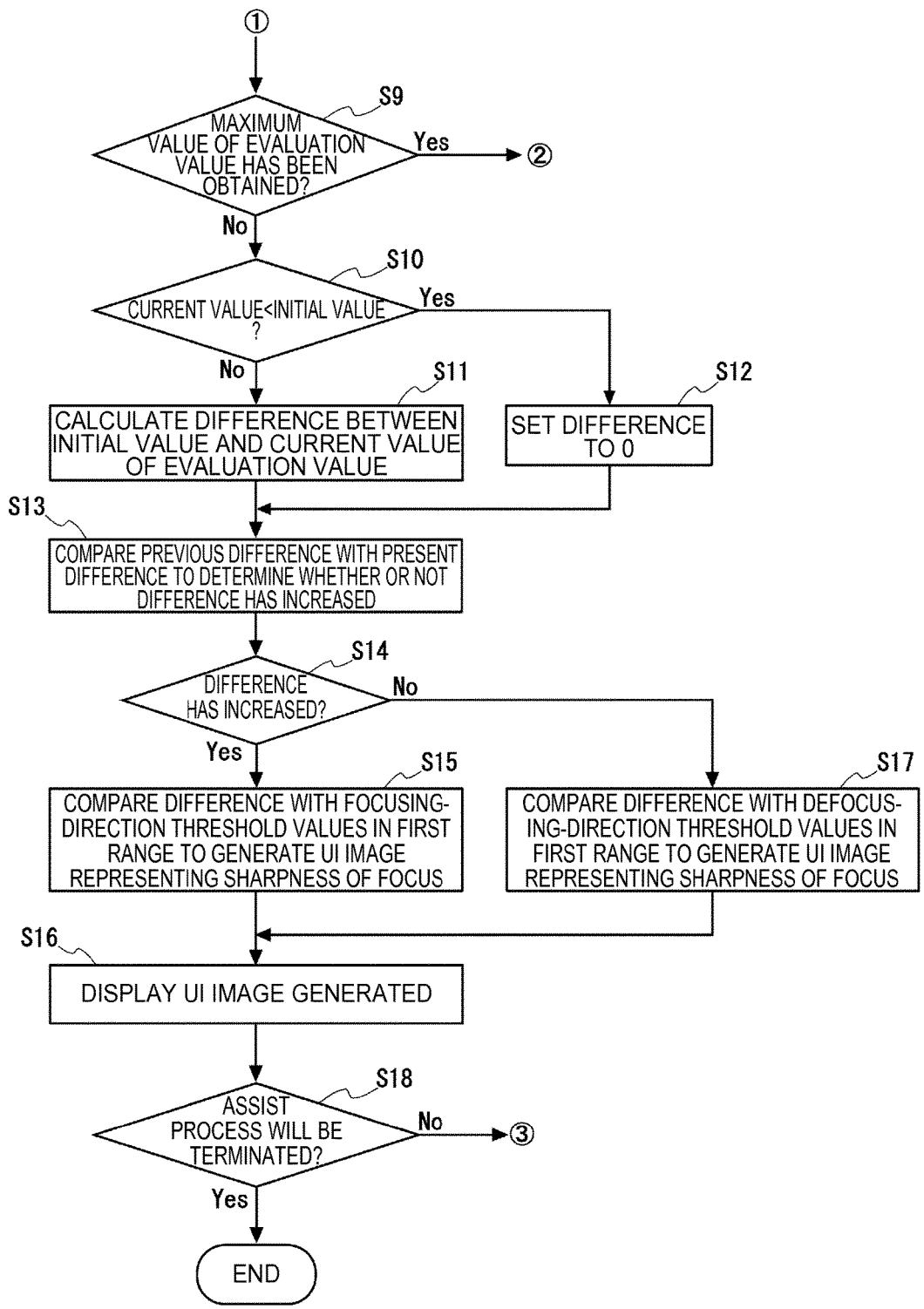
FIG. 10 is a flowchart showing a continuation of the processing procedure shown in FIG. 9.

The process on and after the step S9 will be explained with reference to the flowchart shown in FIG. 10. In the step S9, the display control section 703 determines (step S9) whether or not the maximum value of the evaluation value has been detected by the maximum value detection section 702. In the case of the negative determination (No in the step S9), the display control section 703 determines (step S10) whether or not the current value of the evaluation value having been calculated by the evaluation value calculation section 701 is smaller than the initial value of the evaluation value. In the case of the negative determination (No in the step S10), the display control section 703 calculates (step S11) a difference between the current value of the evaluation value having been calculated by the evaluation value calculation section 701 and the initial value of the evaluation value. Further, in the case of the affirmative determination (Yes in the step S10), the display control section 703 sets (step S12) the difference between the current value and the initial value to 0. After the display control section 703 has calculated the difference, the display control section 703 compares the difference calculated this time and the difference calculated at the previous time with each other to determine (step S13) whether or not the difference has increased compared to that at the previous time. In the case of the affirmative determination (Yes in the step S14), the display control section 703 compares the difference calculated this time in the step S11 or the step S12 and the threshold values with each other to generate (step S15) the UI image 220 representing the sharpness of the focus. It should be noted that as the threshold values used here, the focusing-direction threshold values in a first range are used. The threshold values in the first range are, for example, the threshold values used for the determination of the UI images 220 denoted by the image numbers 7 through 10 shown in FIG. 5. The threshold values used for the determination of the UI images 220 denoted by the image numbers 1 through 6 are not used here. In the case in which the maximum value of the evaluation value has not been detected, by using the threshold values in the first range, there is no chance for the UI image 220 representing the higher sharpness of the focus to be displayed before the maximum value of the evaluation value is detected. After the display control section 703 generates the UI image 220, the display control section 703 displays (step S16) the UI image 220 thus generated on the screen SC.

Further, in the case in which the determination in the step S14 has resulted in the negative determination, the display control section 703 compares the difference calculated this time in the step S11 or the step S12 and the defocusing-direction threshold values in the first range with each other to generate (step S17) the UI image 220 representing the sharpness of the focus.

After displaying the UI image 220 on the screen SC, the display control section 703 determines (step S18) whether or not the assist process will be terminated. In the case of the affirmative determination (Yes in the step S18), the display control section 703 starts a process of projecting the input image, which has been input from the image supply device such as a DVD player or a PC via the cable 500, on the screen SC. Further, in the case of the negative determination (No in the step S18), the display control section 703 returns to the step S5 shown in FIG. 9, and shoots the adjusting image 200 projected on the screen SC using the shooting section 10.

Figure 11:
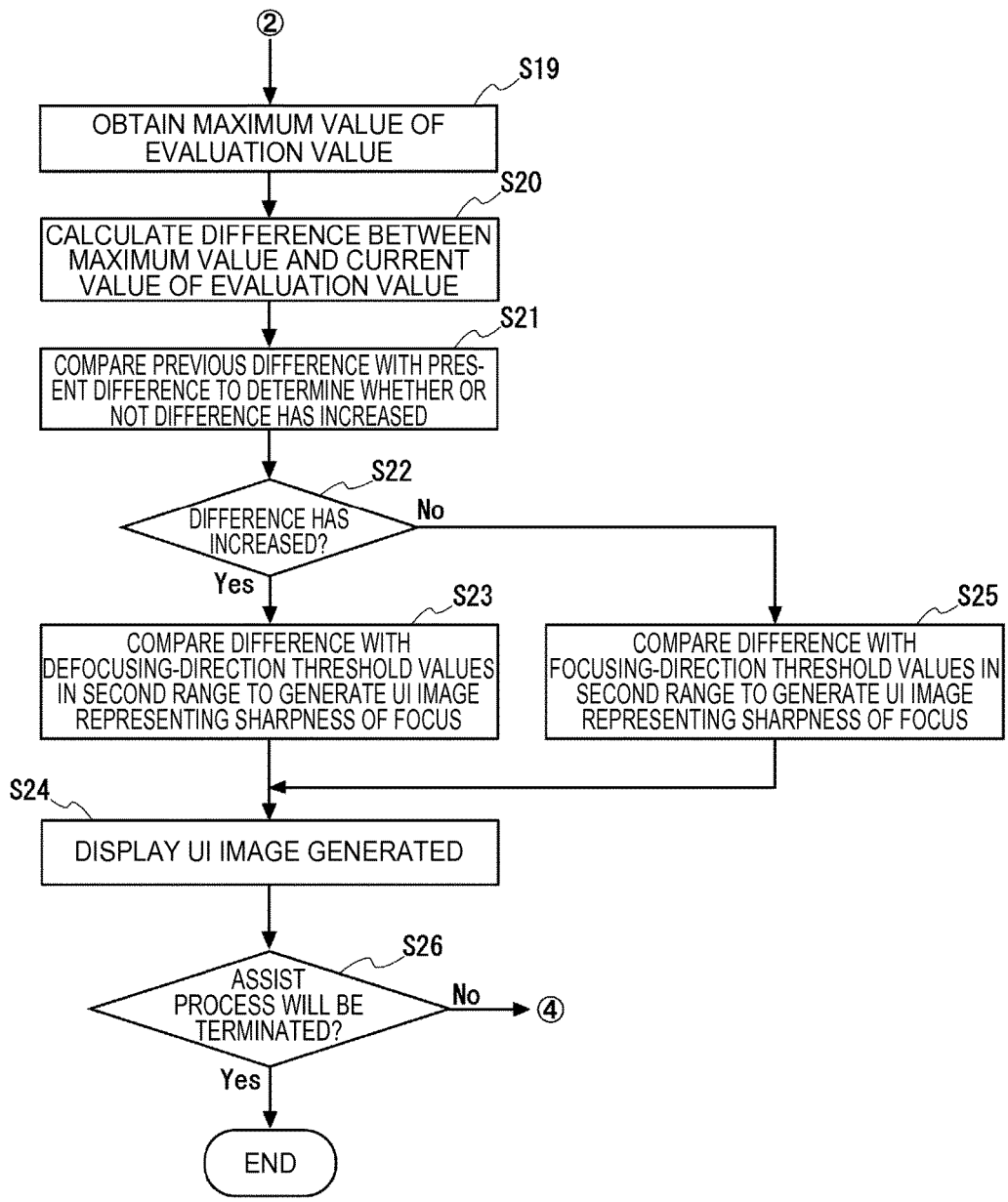
FIG. 11 is a flowchart showing a continuation of the processing procedure shown in FIG. 10.

Then, the process of the control section 700 performed in the case in which the determination in the step S9 has resulted in the affirmative determination will be explained with reference to the flowchart shown in FIG. 11.

In the case in which the determination in the step S9 has resulted in the affirmative determination, namely the case in which the maximum value of the evaluation value has already been detected, the display control section 703 obtains (step S19) the maximum value of the evaluation value from the maximum value detection section 702. The display control section 703 calculates (step S20) a difference between the current value of the evaluation value having been calculated by the evaluation value calculation section 701 and the maximum value of the evaluation value. After the display control section 703 has calculated the difference, the display control section 703 compares the difference calculated this time and the difference calculated at the previous time with each other to determine (step S21) whether or not the difference has increased compared to that at the previous time. In the case of the affirmative determination (Yes in the step S22), the display control section 703 compares the difference calculated this time in the step S20 and the threshold values with each other to generate (step S23) the UI image 220 representing the sharpness of the focus. It should be noted that as the threshold values used here, the defocusing-direction threshold values in a second range are used. The threshold values in the second range are, for example, the threshold values used for the determination of the UI images 220 denoted by the image numbers 1 through 10 shown in FIG. 5. Further, since it has been determined in the determination in the step S22 that the difference has increased, the UI image 220 representing the sharpness of the focus is generated using the defocusing-direction threshold values shown on the right side of the arrow line 40 shown in FIG. 8. After the display control section 703 generates the UI image 220, the display control section 703 displays (step S24) the UI image 220 thus generated on the screen SC.

Further, in the case in which the determination in the step S22 has resulted in the negative determination, the display control section 703 compares the difference calculated this time in the step S20 and the defocusing-direction threshold values in the second range with each other to generate (step S25) the UI image 220 representing the sharpness of the focus. The focusing-direction threshold values are the threshold values shown on the left side of the arrow line 40 shown in FIG. 8.

After displaying the UI image 220 on the screen SC, the display control section 703 determines (step S26) whether or not the assist process will be terminated. In the case of the affirmative determination (Yes in the step S26), the display control section 703 starts the process of projecting the input image, which has been input from the image supply device such as a DVD player or a PC via the cable 500, on the screen SC. After the focus adjustment process has been terminated, since the projection of the input image on the screen SC is started, there is no need for the user to perform the operation for terminating the focus adjustment and the operation for projecting the input image on the screen SC. Further, in the case of the negative determination (No in the step S26), the display control section 703 returns to the step S5 shown in FIG. 9, and shoots the adjusting image 200 projected on the screen SC using the shooting section 10.

Figure 12:
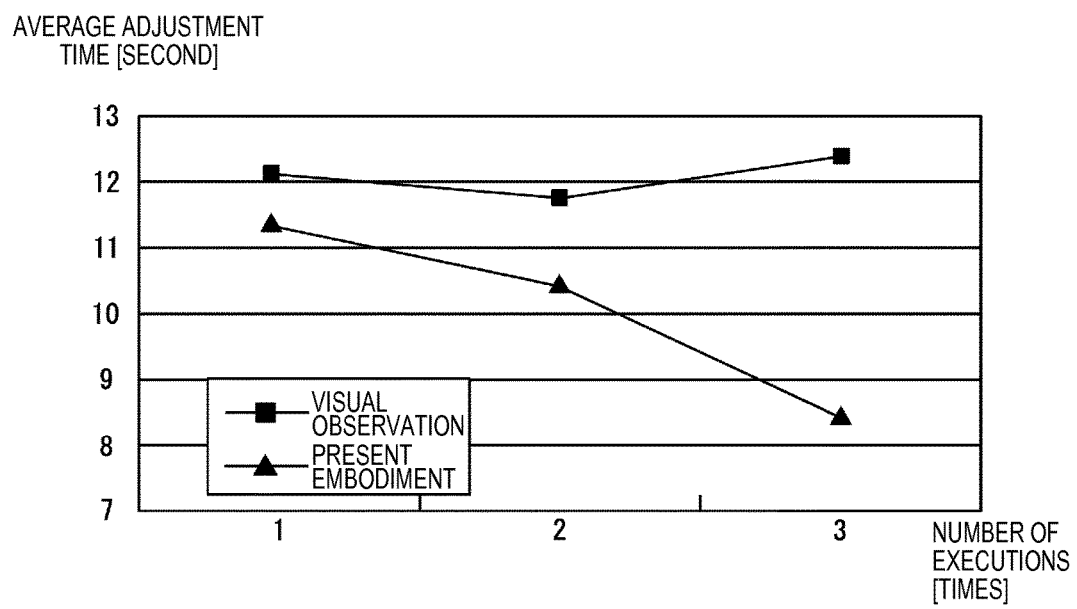
FIG. 12 is a diagram showing a measurement result obtained by measuring time taken by the focus adjustment in the embodiment of the invention.

FIG. 12 shows a measurement result of the adjustment time in the case of adjusting the focus using the focus adjustment method according to the present embodiment and in the case of performing the focus adjustment by visual observation. The focus adjustment according to the present embodiment and the focus adjustment by visual observation were each performed three times by 20 test subjects, and the respective average values of the focus adjustment time were obtained. In FIG. 12, the horizontal axis represents the number of executions (times), and the vertical axis represents the average adjustment time (second). In the focus adjustment according to the present embodiment, the average value of the focus adjustment time was 10.0 seconds while in the focus adjustment by visual observation, the average value was 14.1 seconds. Therefore, the focus adjustment according to the present embodiment can shorten the time necessary for the focus adjustment. Further, it proved that in the focus adjustment according to the present embodiment, the time necessary for the focus adjustment could be shortened each time as shown in FIG. 12.

Figure 13A:
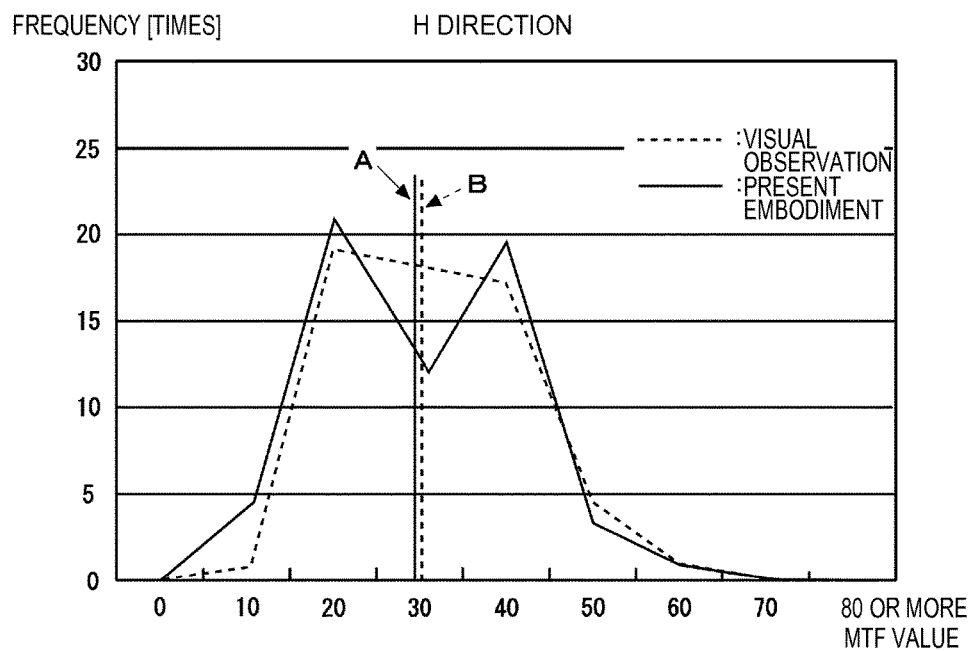
FIGS. 13A and 13B are diagrams showing a result obtained by evaluating the sharpness of the focus in the embodiment of the invention.
Figure 13B:
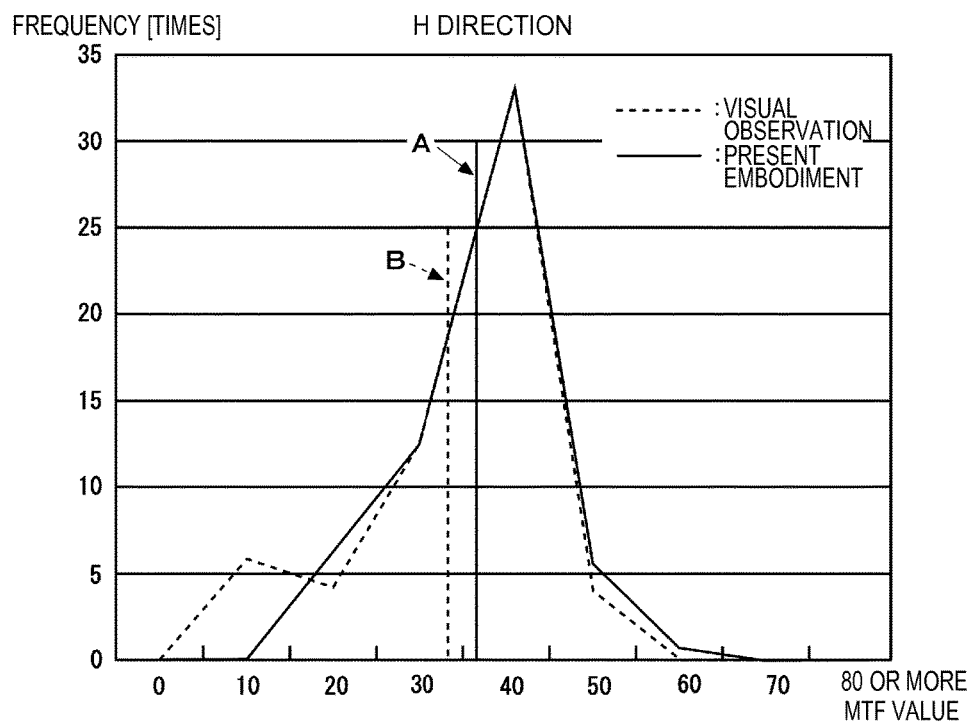
Figure 14A:
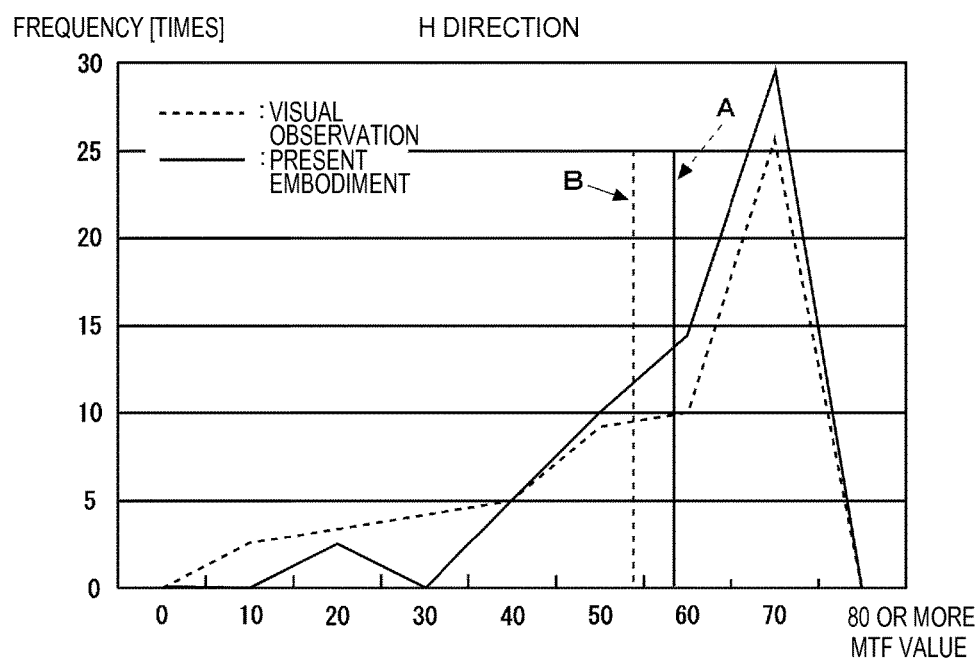
FIGS. 14A and 14B are diagrams showing a result obtained by evaluating the sharpness of the focus in the embodiment of the invention.
Figure 14B:
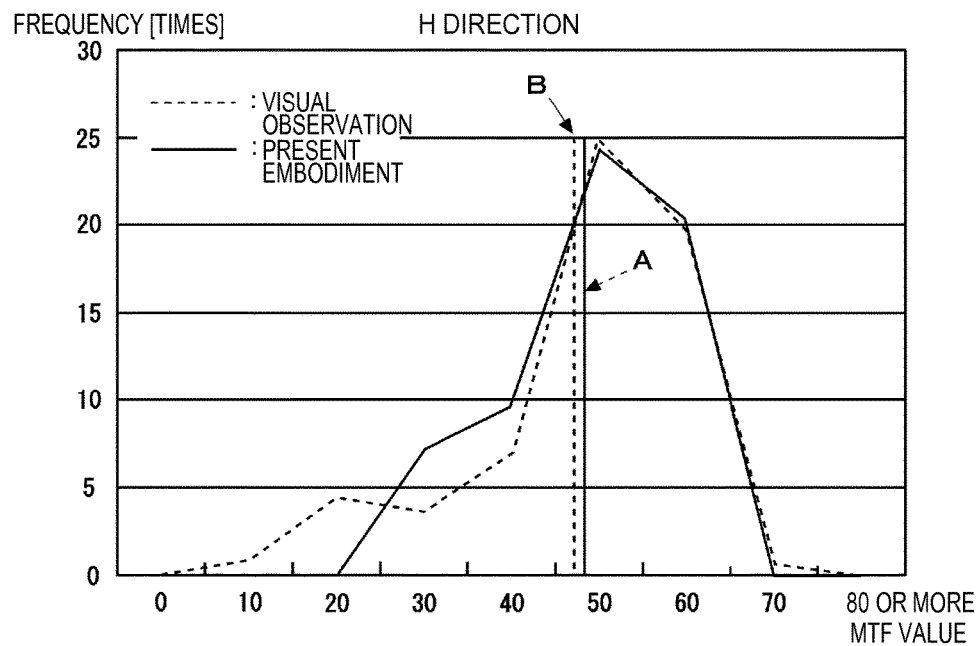
Figure 15A:
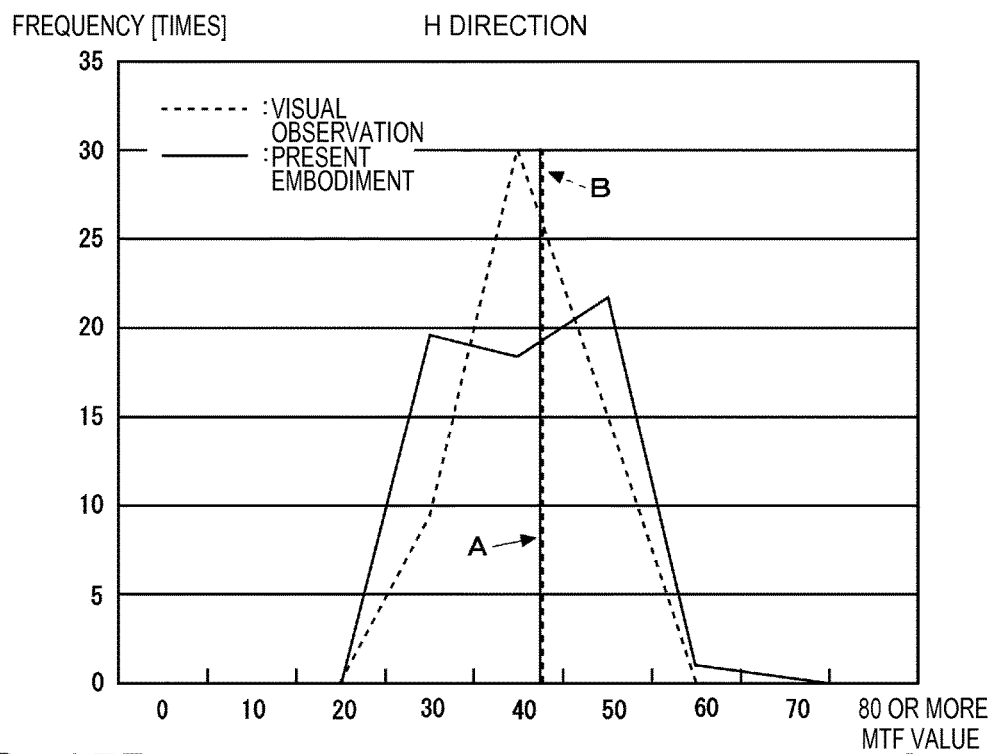
FIGS. 15A and 15B are diagrams showing a result obtained by evaluating the sharpness of the focus in the embodiment of the invention.
Figure 15B:
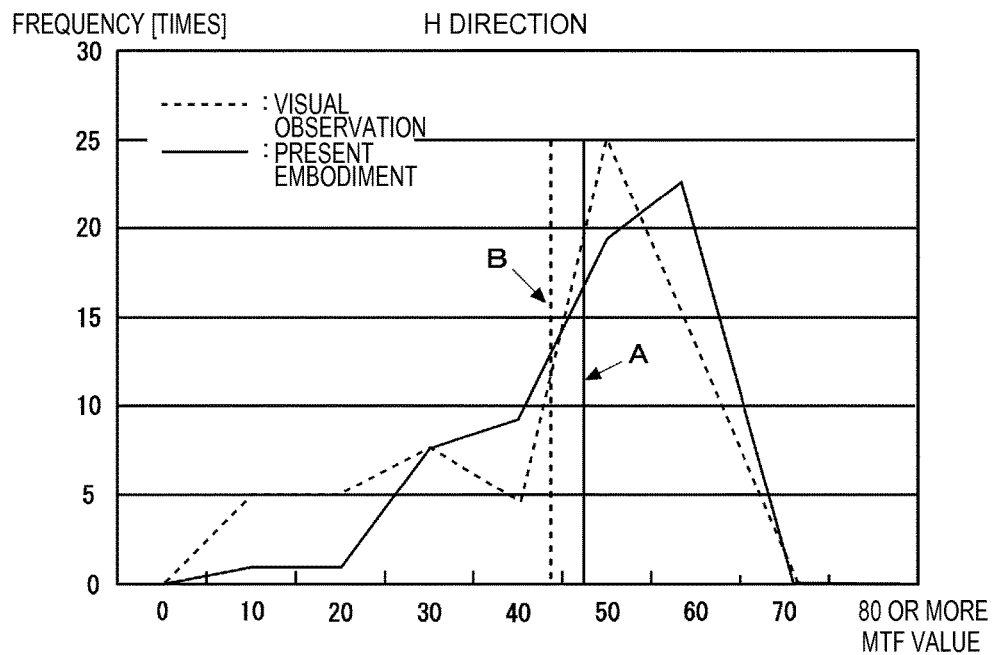
Figure 16A:
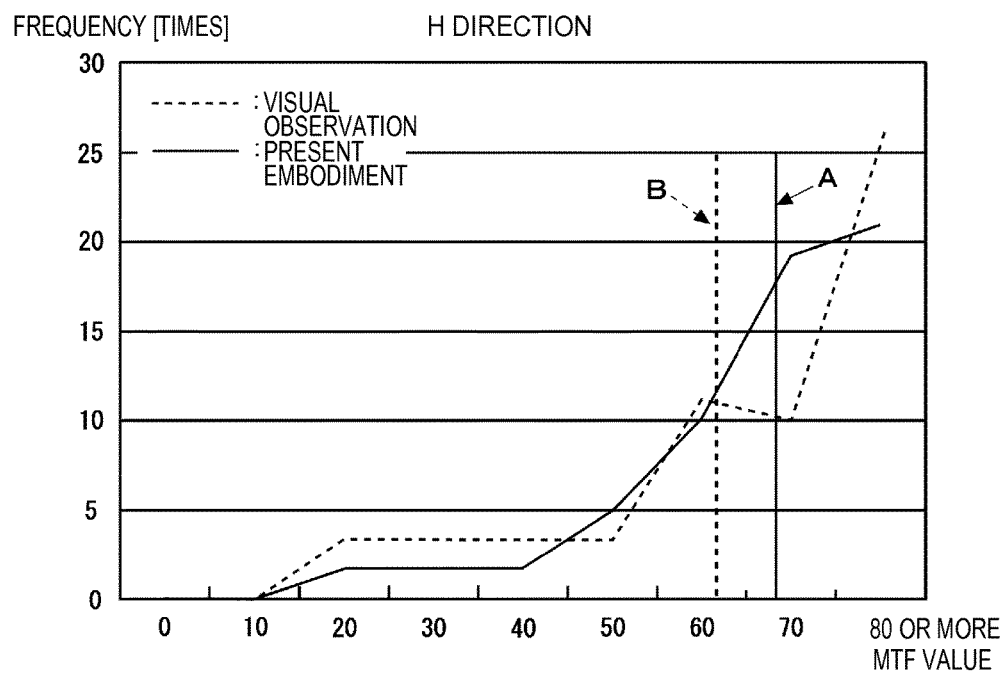
FIGS. 16A and 16B are diagrams showing a result obtained by evaluating the sharpness of the focus in the embodiment of the invention.
Figure 16B:
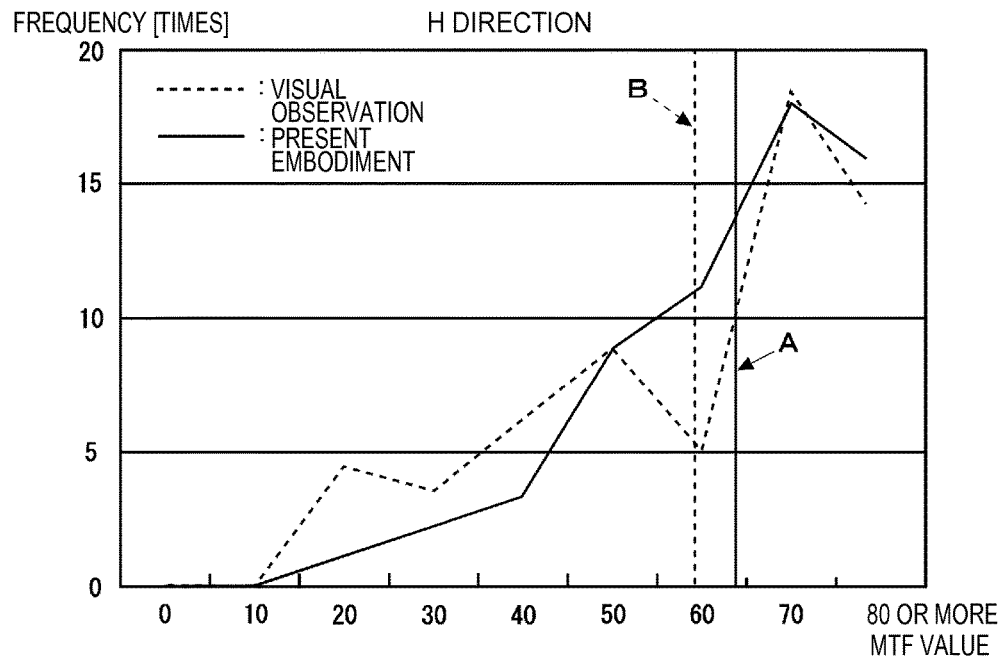

FIGS. 13A, 13B, 14A, 14B, 15A, 15B, 16A, and 16B each show a result of the evaluation of the sharpness of the focus in the case of adjusting the focus using the focus adjustment method according to the present embodiment and in the case of performing the focus adjustment by visual observation. The focus adjustment according to the present embodiment and the focus adjustment by visual observation were each performed three times by 20 test subjects (60 times in total of all the test subjects), and the sharpness of the focus adjustment was evaluated using a modulation transfer function (MTF) value obtained by digitalizing the contrast. FIG. 13A shows a result of the evaluation of the sharpness of the focus in the H direction (the horizontal direction) in the upper left portion of the screen SC. FIG. 13B shows a result of the evaluation of the sharpness of the focus in the V direction (the vertical direction) in the upper left portion of the screen SC. FIG. 14A shows a result of the evaluation of the sharpness of the focus in the H direction (the horizontal direction) in the lower left portion of the screen Sc. FIG. 14B shows a result of the evaluation of the sharpness of the focus in the V direction (the vertical direction) in the lower left portion of the screen SC. FIG. 15A shows a result of the evaluation of the sharpness of the focus in the H direction (the horizontal direction) in the upper right portion of the screen SC. FIG. 15B shows a result of the evaluation of the sharpness of the focus in the V direction (the vertical direction) in the upper right portion of the screen SC. FIG. 16A shows a result of the evaluation of the sharpness of the focus in the H direction (the horizontal direction) in the lower right portion of the screen SC. FIG. 16B shows a result of the evaluation of the sharpness of the focus in the V direction (the vertical direction) in the lower right portion of the screen SC. It should be noted that in FIGS. 13A, 13B, 14A, 14B, 15A, 15B, 16A, and 16B, the horizontal axis represents the MTF value (unitless number), and the vertical axis represents the frequency (times) in the case of making a histogram of the MTF value by 10. Further, in FIGS. 13A, 13B, 14A, 14B, 15A, 15B, 16A, and 16B, the solid line represents the relationship between the MTF value and the frequency in the case of the focus adjustment according to the present embodiment, and the dotted line represents the relationship between the MTF value and the frequency in the case of the focus adjustment by visual observation. Further, in FIGS. 13A, 13B, 14A, 14B, 15A, 15B, 16A, and 16B, the solid line A extending in a vertical direction represents the average value of the MTF value in the case of the focus adjustment according to the present embodiment, and the dotted line B represents the average value of the MTF value in the case of the focus adjustment by visual observation.

With reference to FIGS. 13A, 13B, 14A, 14B, 15A, 15B, 16A, and 16B, there was obtained a result that the focus adjustment according to the present embodiment tends to have a higher average value of the MTF value. Further, it is understood that the focus adjustment according to the present embodiment is lower in frequency of the case in which the MTF value is small (e.g., 0 through 20) than the case of the focus adjustment by visual observation. In other words, the focus can be adjusted with the sharpness of the focus higher than a certain level.

As explained hereinabove in detail, the projector 100 according to the present embodiment is provided with the projection optical system 350, the lens drive section 353, the shooting section 10, and the control section 700 including the evaluation value calculation section 701 and the display control section 703. The projection optical system 350 projects the image on the screen SC. The lens drive section 353 rotates the focus ring 352 in accordance with the operation of the input operation section 90 to adjust the lens position of the projection lens 351 of the projection optical system 350. The shooting section 10 shoots the screen SC. The evaluation value calculation section 701 calculates the evaluation value for evaluating the contrast of the shot image of the shooting section 10. In the case in which the focus adjustment has been performed in response to the operation of the input operation section 90, the display control section 703 makes the image, which corresponds to the difference between the evaluation value calculated after the focus adjustment and the maximum value of the evaluation value calculated before the focus adjustment, be projected on the screen SC.

According to the present embodiment, in the case of performing the focus adjustment of the projector, it is possible to project the image representing the sharpness of the focus on the projection surface. Therefore, it is possible to show the sharpness of the focus to the user in an easy-to-understand manner.

Further, the projector 100 according to the present embodiment is provided with the storage section 750. In the case in which the focus adjustment has been performed in response to the operation of the input operation section 90, the evaluation value calculation section 701 stores the evaluation value, which has been calculated by the evaluation value calculation section 701 with respect to the shot image shot by the shooting section 10 after the focus adjustment, into the storage section 750. The maximum value detection section 702 obtains the maximum value of the evaluation value based on the plurality of evaluation values stored in the storage section 750.

According to the present embodiment, the maximum value of the evaluation value can be detected, and it is possible to project the image, which corresponds to the difference between the evaluation value obtained after the focus adjustment and the maximum value, on the screen SC.

Further, the display control section 703 makes the image, which corresponds to the difference between the initial value of the evaluation value and the evaluation value calculated by the evaluation value calculation section 701 after the focus adjustment, be projected until the maximum value of the evaluation value is obtained. Further, the display control section 703 makes the image, which corresponds to the difference between the maximum value of the evaluation value and the evaluation value calculated by the evaluation value calculation section 701 after the focus adjustment, be projected after the maximum value of the evaluation value is obtained.

According to the present embodiment, since the image representing the difference between the initial value of the evaluation value and the evaluation value obtained after the focus adjustment is displayed until the maximum value is obtained, it is possible to make the user recognize the difference between the initial value of the evaluation value and the evaluation value obtained after the focus adjustment. Further, after the maximum value of the evaluation value is obtained, since the image corresponding to the difference between the maximum value of the evaluation value and the evaluation value obtained after the focus adjustment is displayed, it is possible to make the user recognize the difference between the maximum value of the evaluation value and the evaluation value obtained after the focus adjustment.

Further, the image includes the plurality of figures, and the display control section 703 makes the image, which has the distance between the figures correspond to the difference, be projected on the screen SC. Therefore, the difference between the evaluation value obtained after the focus adjustment and the initial value or the maximum value of the evaluation value can be displayed using the distance between the figures. Therefore, it is possible to display the image easy for the user to recognize the difference.

Further, the display control section 703 selects the distance between the figures in the image from the plurality of levels of distance set in advance, and then makes the image be projected. The display control section 703 has the hysteresis characteristics with respect to the variation in the difference of the evaluation value in the case of changing the distance between the figures in the image in accordance with the difference of the evaluation value obtained after the focus adjustment. Therefore, the fluctuation of the image due to the jitter or the like can be inhibited.

Further, the display control section 703 makes the image having the figure shaped differently be projected in the case in which it is determined that the focus has been achieved based on the evaluation value obtained after the focus adjustment. Therefore, it is possible to easily make the user recognize the case in which it is determined that the focus has been achieved.

The embodiment described above is a preferred embodiment of the invention. It should be noted that the invention is not limited to the embodiment, but can be put into practice with a variety of modifications within the scope or the spirit of the invention.

Figure 17A:
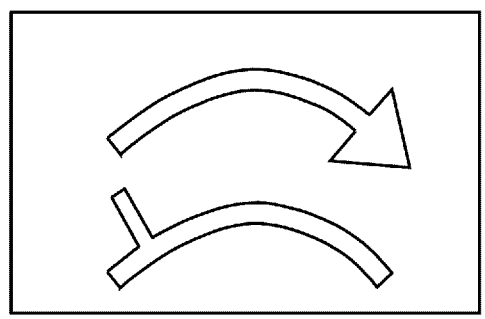
FIGS. 17A and 17B are diagrams each showing an example of an image displayed on a screen in the focus adjustment process of the embodiment of the invention.
Figure 17B:
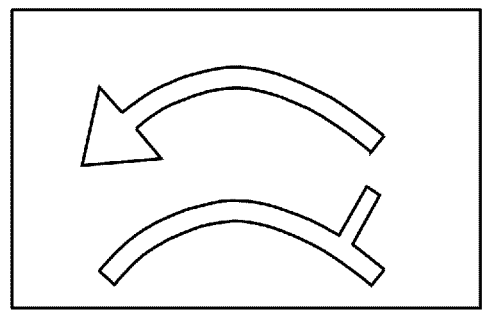

For example, it is also possible to arrange that in the initial stage of the focus adjustment process, the image shown in FIG. 17A or FIG. 17B is displayed on the screen SC to instruct the user on the operation direction of an operation lever. In the images shown in FIGS. 17A and 17B, the operation direction of the operation lever is indicated by the arrow so that the user can recognize the operation direction of the operation lever even in the state in which the screen SC is not focused on and the image is defocused. In the initial stage of the focus adjustment process, the images shown in FIGS. 17A and 17B are appropriately displayed to prompt the user to move the operation lever. Thus, it is possible to make it easy to detect the focused position at which the evaluation value shows the maximum value.

Further, although in the embodiment described above, the UI image 220 representing the sharpness of the focus is projected on the screen SC, it is also possible to output the sharpness of the focus with a sound from the speaker 20. Further, it is also possible to output the sharpness of the focus with a sound from the speaker 20 in addition to displaying the sharpness of the focus with the UI image 220 on the screen SC. The control section 700 outputs the sound signal representing the sharpness of the focus from the speaker 20 based on the evaluation value obtained after the focus adjustment. For example, it is also possible to notify the user of the sharpness of the focus by varying the output volume of the sound or the number of times of outputting a predetermined sound in accordance with the sharpness of the focus.

Further, it is also possible to set the focusing-direction threshold values and the defocusing-direction threshold values which are used before and after the maximum value detection section 702 obtains the maximum value of the evaluation value as follows.

Figure 18A:
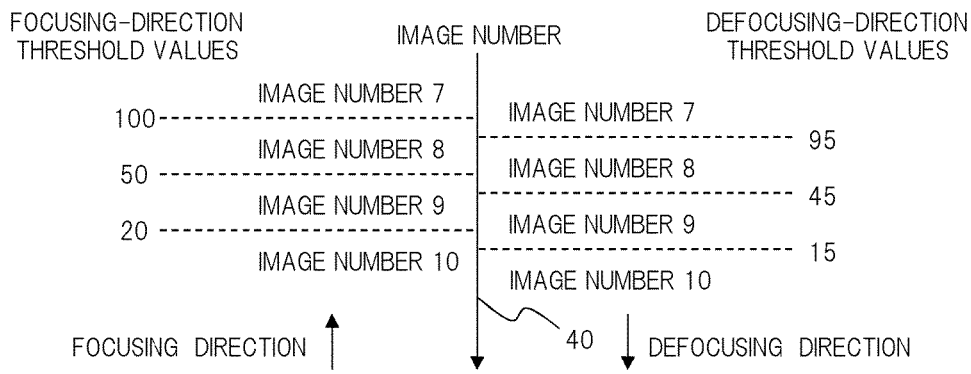
FIGS. 18A and 18B are diagrams showing a relationship between the UI images, and focusing-direction threshold values and defocusing-direction threshold values in the embodiment of the invention.

FIG. 18A shows an example of a relationship between the UI images 220, and the focusing-direction threshold values and the defocusing-direction threshold values which are used before the maximum value detection section 702 obtains the maximum value of the evaluation value. The correspondence relationship between the focusing-direction threshold values and the image numbers is shown on the left side of the arrow line 40, and the correspondence relationship between the defocusing-direction threshold values and the image numbers is shown on the right side of the arrow line 40. The threshold values each representing a separation between the UI images 220 are different between the focusing-direction and the defocusing direction.

For example, in the case of using the focusing-direction threshold values before the maximum value detection section 702 obtains the maximum value, the display control section 703 generates the UI image 220 denoted by the image number 7 in the case in which the difference is no smaller than "100". Similarly, the display control section 703 generates the UI image 220 denoted by the image number 8 in the case in which the difference is smaller than "100" and no smaller than "50". The rest is omitted. Further, in the case of using the defocusing-direction threshold values before the maximum value detection section 702 obtains the maximum value, the display control section 703 generates the UI image 220 denoted by the image number 7 in the case in which the difference is no smaller than "95". Similarly, the display control section 703 generates the UI image 220 denoted by the image number 8 in the case in which the difference is smaller than "95" and no smaller than "45". The rest is omitted. It should be noted that before obtaining the maximum value, the larger the image number becomes, the smaller the threshold values become.

Figure 18B:
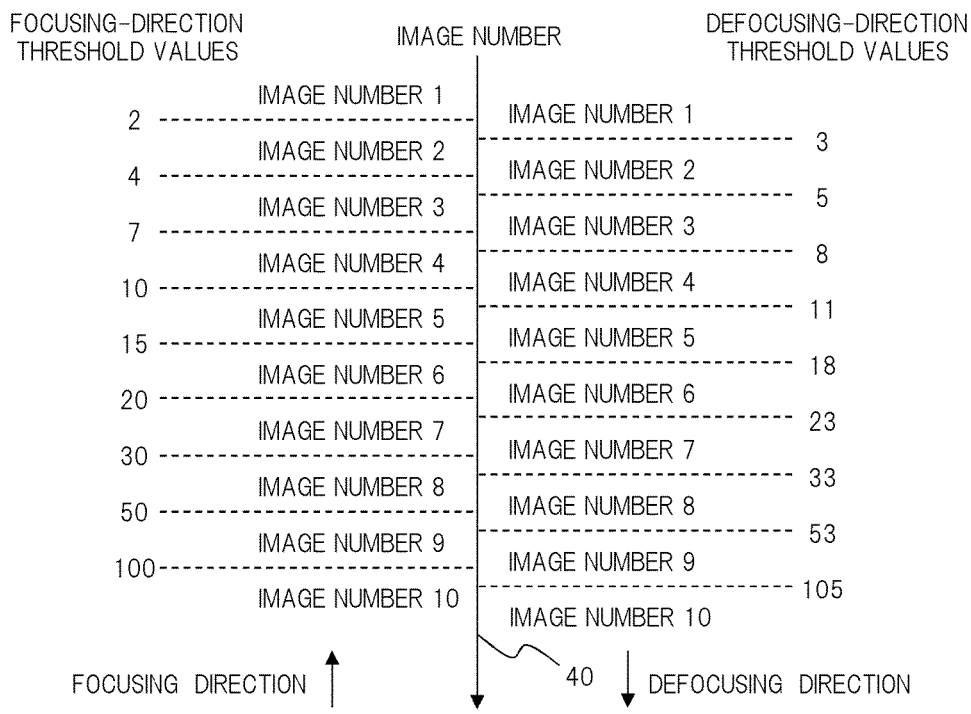

FIG. 18B shows an example of a relationship between the UI images 220, and the focusing-direction threshold values and the defocusing-direction threshold values which are used after the maximum value detection section 702 obtains the maximum value of the evaluation value. The correspondence relationship between the focusing-direction threshold values and the image numbers is shown on the left side of the arrow line 40, and the correspondence relationship between the defocusing-direction threshold values and the image numbers is shown on the right side of the arrow line 40. The threshold values each representing a separation between the UI images 220 are different between the focusing-direction and the defocusing direction.

For example, in the case of using the focusing-direction threshold values after the maximum value detection section 702 obtains the maximum value, the display control section 703 generates the UI image 220 denoted by the image number 1 in the case in which the difference is no smaller than "0" and no larger than "2". Similarly, the display control section 703 generates the UI image 220 denoted by the image number 2 in the case in which the difference is larger than "2" and no larger than "4". The rest is omitted. Further, in the case of using the defocusing-direction threshold values after the maximum value detection section 702 obtains the maximum value, the display control section 703 generates the UI image 220 denoted by the image number 1 in the case in which the difference is no smaller than "0" and no larger than "3". Similarly, the display control section 703 generates the UI image 220 denoted by the image number 2 in the case in which the difference is larger than "3" and no larger than "5". The rest is omitted. It should be noted that after obtaining the maximum value, the larger the image number becomes, the larger the threshold values become.

As described above, the threshold values used before obtaining the maximum value (in the steps S15 and S17 shown in FIG. 10) are the threshold values in the first range. The threshold values in the first range are, for example, the threshold values used for the determination of the UI images 220 denoted by the image numbers 7 through 10 shown in FIG. 5. In the step S15, the UI image 220 representing the sharpness of the focus is generated using the focusing-direction threshold values shown on the left side of the arrow line 40 shown in FIG. 18A. In the step S17, the UI image 220 representing the sharpness of the focus is generated using the defocusing-direction threshold values shown on the right side of the arrow line 40 shown in FIG. 18A.

Further, the threshold values used after obtaining the maximum value (in the steps S23 and S25 shown in FIG. 11) are the threshold values in the second range. The threshold values in the second range are, for example, the threshold values used for the determination of the UI images 220 denoted by the image numbers 1 through 10 shown in FIG. 5. In the step S23, the UI image 220 representing the sharpness of the focus is generated using the defocusing-direction threshold values shown on the right side of the arrow line 40 shown in FIG. 18B. In the step S25, the UI image 220 representing the sharpness of the focus is generated using the focusing-direction threshold values shown on the left side of the arrow line 40 shown in FIG. 18B. It should be noted that in the case in which the UI image 220 generated in the step S23 or the step S25 has been the UI image 220 denoted by the image number 1 representing the focused state, the display control section 703 can determines that the assist process will be terminated in the step S26.

What is claimed is:
1. A projector comprising:
   a projection section adapted to project an image on a projection surface;
   a focus adjustment section adapted to perform a focus adjustment of the projection section in accordance with an operation;
   a shooting section adapted to shoot the projection surface;
   an evaluation value calculation section adapted to calculate an evaluation value used to evaluate contrast of a shot image of the shooting section; and
   a control section adapted to make the projection section project an image, which is a graphical representation illustrating a difference between the evaluation value calculated by the evaluation value calculation section after the focus adjustment and a maximum value of the evaluation values having been calculated by the evaluation value calculation section before the focus adjustment, on the projection surface in a case in which the focus adjustment section has performed the focus adjustment in accordance with the operation,
   wherein the graphical representation includes a set of stages of images which are simultaneously displayed so as to illustrate the sharpness of the focus as the focus adjustment is performed, wherein each of the stages of images includes two circles, wherein the distance between the two circles represents the sharpness of the image.
2. The projector according to claim 1, further comprising:
   a storage section,
   wherein the control section stores the evaluation value, which has been calculated by the evaluation value calculation section with respect to the shot image shot by the shooting section after the focus adjustment, in the storage section in the case in which the focus adjustment section has performed the focus adjustment in accordance with the operation, and then the control section obtains the maximum value of the evaluation value based on the evaluation values stored in the storage section.

3. The projector according to claim 1, wherein
the control section makes the image, which corresponds to a difference between an initial value of the evaluation value and the evaluation value calculated by the evaluation value calculation section after the focus adjustment, be projected until the maximum value of the evaluation value is obtained, and
the control section makes the image, which corresponds to a difference between the maximum value of the evaluation value and the evaluation value calculated by the evaluation value calculation section after the focus adjustment, be projected after the maximum value of the evaluation value is obtained.

4. The projector according to claim 1, wherein
the image includes a plurality of figures, and
the control section makes the image, which has a distance between the figures correspond to the difference, be projected on the projection surface.

5. The projector according to claim 4, wherein
the control section selects the distance between the figures in the image from a plurality of levels of distance set in advance, and then makes the image be projected, and
the control section has hysteresis characteristics with respect to a variation in the difference of the evaluation value in a case of changing the distance between the figures in the image in accordance with the difference of the evaluation value after the focus adjustment by the focus adjustment section.

6. The projector according to claim 4, wherein
the control section causes the image having the figure to be shaped differently in a case in which it is determined that the focus has been achieved based on the evaluation value obtained after the focus adjustment by the focus adjustment section.

7. The projector according to claim 1, further comprising:
a sound output section adapted to output a sound,
wherein the control section makes the sound output section output the sound based on the evaluation value obtained after the focus adjustment by the focus adjustment section.

8. A method of controlling a projector, comprising:
performing a focus adjustment of a projection section adapted to project an image on a projection surface in accordance with an operation;
shooting the projection surface by a shooting section;
calculating an evaluation value used to evaluate contrast of a shot image of the shooting section; and
making the projection section project an image, which is a graphical representation illustrating a difference between the evaluation value calculated in the calculating of an evaluation value after the focus adjustment and a maximum value of the evaluation values having been calculated in the calculating of an evaluation value before the focus adjustment, on the projection surface in a case in which the focus adjustment has been performed in the performing of a focus adjustment,
wherein the graphical representation includes a set of stages of images which are simultaneously displayed so as to illustrate the sharpness of the focus as the focus adjustment is performed, wherein each of the stages of images includes two circles, wherein the distance between the two circles represents the sharpness of the image.

9. A projector to project an image on a projection surface, comprising:
a camera that shoots the projection surface;
a processor configured to;
perform a focus adjustment of the image in accordance with an operation;
calculate an evaluation value used to evaluate contrast of a shot image of the camera; and
project an image, which is a graphical representation illustrating a difference between the evaluation value calculated after the focus adjustment and a maximum value of the evaluation values having been calculated before the focus adjustment, on the projection surface in a case in which the focus adjustment has been performed in accordance with the operation,
wherein the graphical representation includes a set of stages of images which are simultaneously displayed so as to illustrate the sharpness of the focus as the focus adjustment is performed, wherein each of the stages of images includes two circles, wherein the distance between the two circles represents the sharpness of the image.

10. A method of controlling a projector to project an image on a projection surface, comprising:
performing a focus adjustment of the image in accordance with an operation;
shooting the projection surface by a camera;
calculating an evaluation value used to evaluate contrast of a shot image of the camera; and
projecting an image, which is a graphical representation illustrating a difference between the evaluation value calculated in the calculating of an evaluation value after the focus adjustment and a maximum value of the evaluation values having been calculated in the calculating of an evaluation value before the focus adjustment, on the projection surface in a case in which the focus adjustment has been performed in the performing of a focus adjustment,
wherein the graphical representation includes a set of stages of images which are simultaneously displayed so as to illustrate the sharpness of the focus as the focus adjustment is performed, wherein each of the stages of images includes two circles, wherein the distance between the two circles represents the sharpness of the image.

* * * * *